(12) United States Patent
Hata et al.

(10) Patent No.: US 7,081,060 B2
(45) Date of Patent: Jul. 25, 2006

(54) POWER TRANSMISSION SYSTEM

(75) Inventors: Hiroshi Hata, Susono (JP); Masahiro Kojima, Susono (JP); Masatoshi Adachi, Susono (JP); Takashi Shimizu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/032,067

(22) Filed: Dec. 31, 2001

(65) Prior Publication Data

US 2002/0094898 A1 Jul. 18, 2002

(30) Foreign Application Priority Data

Jan. 12, 2001 (JP) .................................. 2001-005737
Nov. 29, 2001 (JP) .................................. 2001-365295

(51) Int. Cl.
*F16H 3/72* (2006.01)

(52) U.S. Cl. .................................. 475/5; 180/65.2
(58) Field of Classification Search ............. 475/5; 180/65.2, 65.4

See application file for complete search history.

(56) References Cited

U.S. PATENT DOCUMENTS

| 3,623,568 A | 11/1971 | Mori |
| 5,513,719 A * | 5/1996 | Moroto et al. ............. 180/65.4 |
| RE36,678 E * | 5/2000 | Moroto et al. ............. 180/64.5 |
| 6,371,878 B1 | 4/2002 | Bowen |

FOREIGN PATENT DOCUMENTS

| EP | 0937600 | 8/1999 |
| EP | 1026023 | 8/2000 |
| JP | 47-31773 | 8/1972 |
| JP | 50-30223 | 3/1975 |
| JP | 50-18136 | 6/1975 |
| JP | 57-59124 | 9/1980 |
| JP | 07-336810 | 12/1995 |
| JP | 8-183347 | 7/1996 |
| JP | 2000-2327 | 1/2000 |
| JP | 2000-32610 | 1/2000 |
| JP | 2000-078705 | 3/2000 |
| JP | 2000-343964 | 12/2000 |
| JP | 2001-055052 | 2/2001 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A power transmission system comprising: a power synthesizing mechanism connected in a power transmitting manner to an electric motor and a power generator; and a speed change mechanism for changing the rotating speed of the electric motor to transmit the motor torque to the power synthesizing mechanism. An arranging region for the electric motor and an arranging region for the power generator do not overlap on each other in the axial directions of the output shaft of the electric motor and the rotary shaft of the power generator.

47 Claims, 8 Drawing Sheets

FORWARD ⇐    ⇒ BACKWARD

FORWARD ⇐ ⇒ BACKWARD

POWER TRANSMISSION SYSTEM

BACKGROUND OF THE INVENTION

1. Field of the Invention

The present invention relates to a power transmission system including a power synthesizing mechanism connected to an electric motor and a power generator.

2. Related Art

In the recent years, there has been proposed a hybrid vehicle, on which an engine for outputting a power by burning a fuel and an electric motor for outputting a power by feeding it with an electric power are mounted as a drive source of the vehicle. On the basis of various conditions, the hybrid vehicle is enabled to improve the fuel economy and to reduce the noise and the exhaust gas emission by controlling the drive/stop of the engine and the electric motor.

One example of the hybrid vehicle having a plurality of drive sources mounted thereon is disclosed in Japanese Patent Laid-Open No. 8-183347 (JPA8-183347). The disclosed hybrid vehicle is constructed to include an engine, a power generator, a planetary gear unit, an electric motor and a differential. The output shaft of the engine and the rotor of the power generator are arranged concentrically with each other, and the planetary gear unit is arranged between the engine and the power generator. The planetary gear unit is equipped with a sun gear connected to a rotor, a pinion gear meshing with the sun gear and a ring gear, and a carrier holding the pinion gear and connected to the output shaft of the engine.

To the ring gear, moreover, there is connected the output shaft, which is equipped with a first gear. In parallel with the output shaft of the engine, there is disposed a counter shaft, which is equipped with a third gear and a fourth gear. The third gear meshes with the first gear. To the rotor of the electric motor, on the other hand, there is connected a second gear, which meshes with the third gear. Moreover, the differential is equipped with a fifth gear, which meshes with the fourth gear.

In the hybrid vehicle disclosed, moreover, the power outputted from the engine and the power outputted from the electric motor are synthesized by the third gear, and the synthesized torque can be transmitted to the differential. Still moreover, the electric power, which is generated as the power generator is rotated, is stored in a battery.

In the above-mentioned Japanese Patent Laid-Open, the second gear and the third gear function as the speed change mechanism to change the rotating speed of the electric motor and to synthesize the power of the electric motor and the power of the engine, while being prepared for the case in which the demand for raising the output of the electric motor occurs. The necessity for such a speed change mechanism raises a problem that the power transmission system is enlarged in size.

SUMMARY OF THE INVENTION

A main object of the invention is to provide a power transmission system which can minimize the enlargement of the arranging spaces as a whole, when the speed change mechanism which controls the output of the electric motor is provided.

According an aspect of the invention, there is provided a power transmission system comprising: a power synthesizing mechanism connected in a power transmitting manner to an electric motor and a power generator; and a speed change mechanism for changing the rotating speed of the electric motor to transmit the motor torque to the power synthesizing mechanism. An arranging region for the electric motor and an arranging region for the power generator do not overlap on each other in the axial directions of the output shaft of the electric motor and the rotary shaft of the power generator.

In the power transmission system of the invention, the arranging region for the power generator and the arranging region for the electric motor in the axial directions do not overlap on each other so that the power generator and the electric motor can be prevented from contacting with each other even if at least one of the arranging spaces for the power generator and the electric motor is enlarged. It is, therefore, possible to change the capacity or rating of the power generator or the electric motor arbitrarily.

In the power transmission system of the invention, moreover, the output shaft of the engine and the output shaft of the electric motor can be arranged in the transverse direction of a vehicle.

According to the power transmission system thus constructed, the function of the electric motor can be changed by enlarging the external diameter of the electric motor. Therefore, the electric motor can be suppressed from becoming large in the axial direction, thereby to improve the mountability of the electric motor in the transverse direction of the vehicle.

In the power transmission system of the invention, moreover, the power synthesizing mechanism is constructed to include a first planetary gear mechanism having: a first sun gear; a first ring gear arranged on the outer side of the first sun gear; and a first carrier for holding a first pinion gear meshing with the first sun gear and the first ring gear.

In the power transmission system of the invention, moreover, the speed change mechanism is constructed to include a second planetary gear mechanism having: a second sun gear; a second ring gear arranged on the outer side of the second sun gear; and a second carrier for holding a second pinion gear meshing with the second sun gear and the second ring gear.

In the power transmission system of the invention, moreover, the speed change mechanism is constructed to have any of the second sun gear, the second ring gear and the second carrier fixed, so that the rotating speed of the electric motor is changed to transmit the motor torque to the power synthesizing mechanism.

In the power transmission system of the invention, moreover: the first carrier of the first planetary gear mechanism and an engine are connected to each other; the electric motor and the second sun gear of the second planetary gear mechanism are connected to each other; the second carrier of the second planetary gear mechanism is fixed; and the first ring gear of the first planetary gear mechanism and the second ring gear of the second planetary gear mechanism are connected to each other.

In the power transmission system of the invention, moreover, a first holding member for holding the first ring gear of the first planetary gear mechanism and the second ring gear of the second planetary gear mechanism rotatably is arranged on the outer side of the first ring gear and the second ring gear.

According to the power transmission system thus constructed, the first holding member, the first ring gear and the second ring gear are juxtaposed in the radial direction so that the arranging spaces for those gears in the axial directions can be suppressed from becoming large. Therefore, the mountability on the vehicle is improved.

In the power transmission system of the invention, moreover, at least a portion of the arranging region for the first holding member and at least a portion of the arranging region for the electric motor overlap on each other in the axial direction of the output shaft of the electric motor.

According to the power transmission system thus constructed, the arranging spaces for the electric motor and the first holding member can be suppressed to suppress the arranging spaces for the parts in the axial direction from becoming large. Therefore, the mountability on the vehicle is improved.

In the power transmission system of the invention, therefore, a rotary member for connecting the engine and the first carrier and the output shaft of the electric motor are arranged on the common axis.

According to the power transmission system thus constructed, the arranging space for the electric motor in the radial directions of the rotary member and the output shaft is narrowed.

In the power transmission system of the invention, moreover, the output shaft of the electric motor and a rotary member connected to the engine are unconcentrically arranged.

In the power transmission system of the invention, moreover: the speed change mechanism includes an internal gear; the first gear connected to the output shaft of the electric motor is arranged in the inside space of the internal gear; and the first gear and the internal gear mesh with each other.

According to the power transmission system thus constructed, it is possible to narrow the arranging spaces for the power synthesizing mechanism and the first gear in the radial direction and to enlarge the radius of the first gear.

In the power transmission system of the invention, moreover, a second holding member for holding the internal gear rotatably is arranged on the outer side of the internal gear.

According to the power transmission system thus constructed, it is possible to shorten the arranging space for the internal gear and the second holding member in the axial directions.

In the power transmission system of the invention, moreover, at least a portion of the arranging region for the electric motor and at least a portion of the arranging region for the second holding member overlap on each other in the axial direction of the output shaft of the electric motor.

According to the power transmission system thus constructed, the arranging spaces for a coil of the electric motor and the second holding member in the axial directions can be shortened by making use of the dead space formed on the inner side of the coil in the radial direction of the electric motor.

In the power transmission system of the invention, moreover: there is provided a second gear made rotatable together with the first ring gear; the output shaft of the engine is connected to the first sun gear; and the speed change mechanism includes the second gear, and a third gear for transmitting the power of the electric motor to the second gear.

According to the power transmission system thus constructed, it is possible to shorten the arranging spaces for the speed change mechanism and the power synthesizing mechanism in the axial directions.

In the power transmission system of the invention, moreover: there are provided a fourth gear made rotatable together with the first ring gear, and a fifth gear made rotatable together with the fourth gear; the output shaft of the engine is connected to the first sun gear; the speed change mechanism includes the fourth gear, and a sixth gear for transmitting the power of the electric motor to the fourth gear; and the power of the first ring gear and the power of the fourth gear are synthesized so that the synthesized power is transmitted through the fifth gear to wheels.

According to the power transmission system thus constructed, the gear ratio between the second gear and the third gear can be set independently of the gear ratio on the side of the fourth gear.

In the power transmission system of the invention, in addition to the construction described above: there are provided a seventh gear made rotatable together with the first ring gear, and an eighth gear meshing with the seventh gear; the speed change mechanism includes the eighth gear, and a ninth gear for transmitting the power of the electric motor to the eighth gear; and the power of the seventh gear and the power of the ninth gear are synthesized so that the synthesized power is transmitted through the eighth gear to wheels.

In the power transmission system of the invention, moreover, a space for separating the arranging region for the electric motor and the arranging region for the power generator is formed between the electric motor and the power generator in the axial direction, and arranges the power synthesizing mechanism and the speed change mechanism therein.

According to the power transmission system thus constructed, the space for separating the arranging region for the electric motor and the arranging region for the power generator also functions as the spaces for arranging the power synthesizing mechanism and the speed change mechanism. Therefore, the spaces for arranging the power synthesizing mechanism and the speed change mechanism need not be especially formed to contribute to the size reduction of the power transmission system.

In the power transmission system of the invention, moreover, there is comprised: a wound transmission member made to run on the output member of the power synthesizing mechanism and an intermediate rotary member; a differential arranged concentrically with the intermediate rotary member; and a decelerating planetary gear mechanism arranged concentrically with the intermediate rotary member and the differential, and, when transmitting the power of the intermediate rotary member to the differential, transmitting the power by decelerating the rotating speed of the power.

According to the power transmission system thus constructed, a rotary member for rotating on an axis different from the output member of the power synthesizing mechanism or the differential need not be disposed between the output member of the power synthesizing mechanism and the differential. Therefore, the number of parts of the power transmission system can be suppressed from increasing, to contribute to the size reduction and the light weight of the power transmission system.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
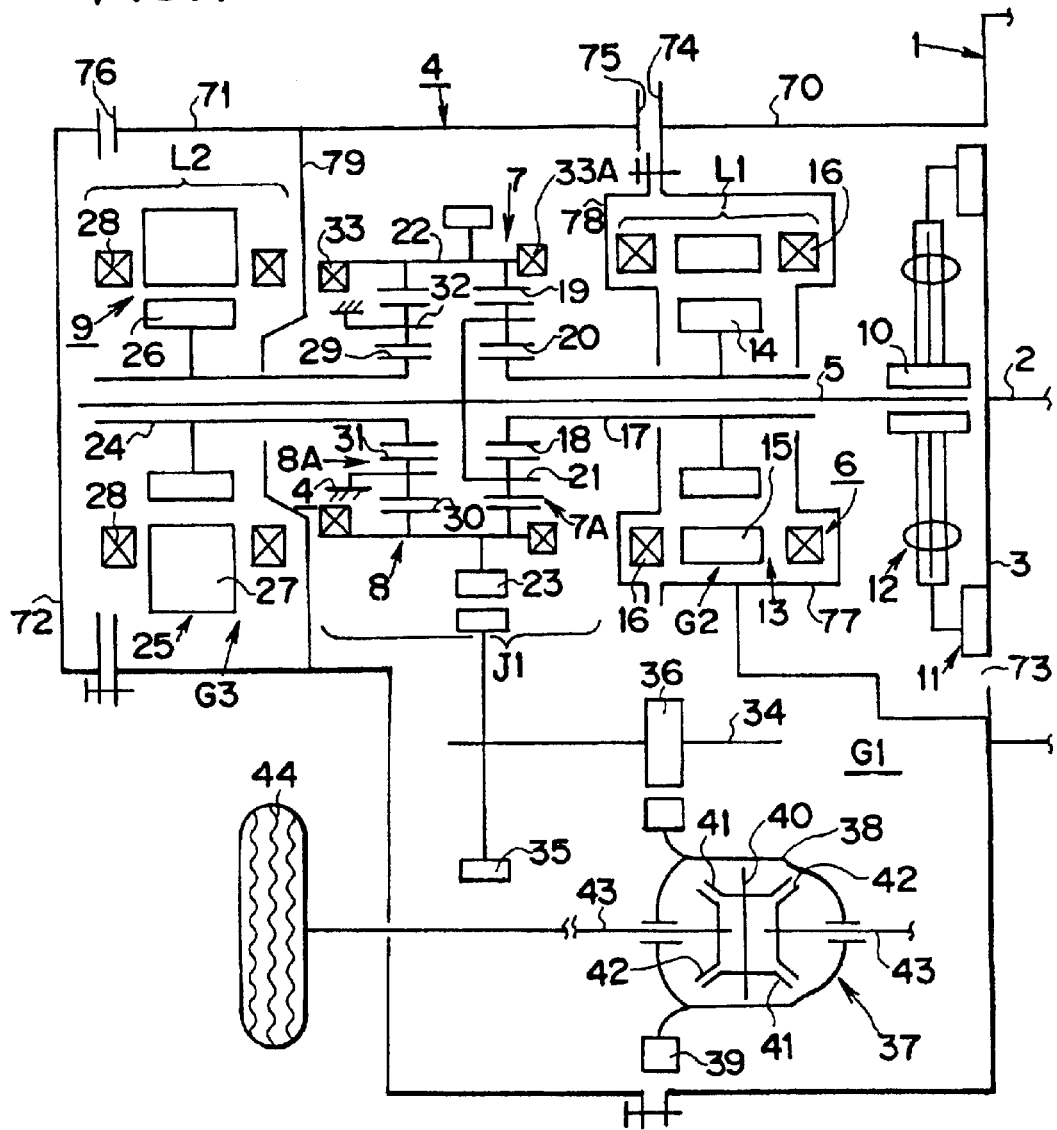
FIG. 1 is a skeleton diagram showing one embodiment of a power transmission system of this invention.

This invention will be specifically described with reference to the accompanying drawings. FIG. 1 is a skeleton diagram showing a power transmission system of an FF (Front-engine/Front-drive) type hybrid vehicle according to one embodiment of the invention. In FIG. 1, reference numeral 1 designates an engine, which can be exemplified by an internal combustion engine such as a gasoline engine, a Diesel engine, an LPG engine, a methanol engine or a hydrogen engine.

This embodiment will be conveniently described on the case in which the gasoline engine is used as the engine 1. This engine 1 is a device for outputting a drive power from a crankshaft 2 when the fuel is burned, and is of the well-known type which is equipped with an intake unit, an exhaust unit, a fuel injection unit, an ignition unit and a cooling unit. The crankshaft 2 is arranged horizontally in the transverse direction of the vehicle. The crankshaft 2 is equipped with a flywheel 3 at its rear end portion.

To the outer wall of this engine 1, there is attached a hollow transaxle case 4. This transaxle case 4 is equipped with an engine side housing 70, an extension housing 71 and an end cover 72. These engine side housing 70, extension housing 71 and end cover 72 are molded of a metallic material such as aluminum. With one open end 73 of the engine side housing 70 and the engine 1 contacting with each other, moreover, the engine 1 and the engine side housing 70 are fixed to each other.

Moreover, the extension housing 71 is arranged between the engine side housing 70 and the end cover 72. With the other open end 74 of the engine side housing 70 and one open end 75 of the extension housing 71 contacting with each other, still moreover, the engine housing 70 and the extension housing 71 are fixed to each other. Furthermore, the end cover 72 and the extension housing 71 are so fixed to each other that the end cover 72 is attached to close the other open end 76 of the extension housing 71.

Inside G1 of the transaxle case 4, there are mounted an input shaft 5, a first motor/generator 6, a power synthesizing mechanism 7, a speed change mechanism 8 and a second motor/generator 9. The input shaft 5 is arranged concentrically with the crankshaft 2. To the end portion of the input shaft 5 on the side of the crankshaft 2, there is splined a clutch hub 10.

There is provided a clutch 11 for controlling the power transmission state between the flywheel 3 and the input shaft 5. There is also provided a damper mechanism 12 for suppressing/absorbing the torque fluctuation between the flywheel 3 and the input shaft 5. The first motor/generator 6 is arranged outside of the input shaft 5, and the second motor/generator 9 is arranged at a position farther from the engine 1 than the first motor/generator 6.

Specifically, the first motor/generator 6 is arranged between the engine 1 and the second motor/generator 9. The first motor/generator 6 and the second motor/generator 9 are provided with: a function (or a power function) acting as an electric motor to be activated when an electric power is fed; and a function (or a regenerative function) acting as a power generator to convert a mechanical energy into an electric energy. As the first motor/generator 6 and the second motor/generator 9, there can be used an AC synchronous type motor/generator, for example. A power feed unit for feeding the electric power to the first motor/generator 6 and the second motor/generator 9 can be exemplified by a capacitance unit such as a battery or a capacitor, or a well-known fuel cell.

Here will be specifically described the arranged position and the construction of the first motor/generator 6. On the inner side of the engine side housing 70, there is formed a partition 77 which is extended toward the side of the engine 1 and then toward the side of the input shaft 5. On the partition 77, moreover, there is fixed a case cover 78. This case cover 78 has a shape, in which it is extended apart from the engine 1 and then toward the side of the input shaft 5. Moreover, the first motor/generator 6 is arranged in a space G2 defined by the partition 77 and the case cover 78. The first motor/generator 6 is equipped with a stator 13 fixed on the side of the transaxle case 4, and a rotatable rotor 14. The stator 13 is equipped with an iron core 15 fixed on the partition 77, and a coil 16 wound on the iron core 15.

The stator 13 and the rotor 14 are constructed by laminating a plurality of electromagnetic steel sheets of a predetermined thickness in their thickness direction. Here, the plurality of electromagnetic steel sheets are laminated in the axial direction of the input shaft 5. Moreover, the two ends of the coil 16 of the first motor/generator 6 in the axial direction of the input shaft 5 defines an arranging region L1 of the first motor/generator 6 in the axial direction of the input shaft 5. Around this input shaft 5, on the other hand, there is mounted a hollow shaft 17. These input shaft 5 and hollow shaft 17 are made rotatable relative to each other. The rotor 14 is connected to the outer circumference of the hollow shaft 17.

Moreover, the power synthesizing mechanism (or the power dividing mechanism) 7 is interposed between the first motor/generator 6 and the second motor/generator 9. This power synthesizing mechanism 7 is provided with the so-called "single pinion type planetary gear mechanism 7A". Specifically, this planetary gear mechanism 7A is equipped with a sun gear 18, a ring gear 19 arranged concentrically with the sun gear 18, and a carrier 21 holding a pinion gear 20 meshing with the sun gear 18 and the ring gear 19. Moreover, the sun gear 18 and the hollow shaft 17 are connected to each other, and the carrier 21 and the input shaft 5 are connected to each other. Here, the ring gear 19 is formed on the inner circumference side of an annular member (or a cylindrical member) 22 arranged concentrically with the input shaft 5, and a counter drive gear 23 is formed on the outer circumference side of the annular member 22.

On the outer circumference of the input shaft 5, on the other hand, there is mounted a hollow shaft 24 rotatably, and the second motor/generator 9 is arranged on the outer circumference side of the hollow shaft 24. Here will be specifically described the arrangement and the construction of the second motor/generator 9. On the inner face of the extension housing 71, there is formed a partition 79 which is extended toward the side of the input shaft 5. Moreover, the second motor/generator 9 is arranged in a space G3 which is defined by the extension housing 71, the partition 79 and the rear cover 72.

The second motor/generator 9 is provided with a stator 25 fixed on the transaxle case 4, and a rotatable rotor 26. The stator 25 is equipped with an iron core 27, and a coil 28 wound on the iron core 27. The stator 25 and the rotor 26 are constructed by laminating a plurality of electromagnetic steel sheets of a predetermined thickness in their thickness direction. Here, the plurality of the electromagnetic steel sheets are laminated in the axial direction of the input shaft 5. Moreover, the two ends of the coil 28 of the second motor/generator 9 in the axial direction of the input shaft 5 define the arranging region L2 of the second motor/generator 9 in the axial direction of the input shaft 5. Here, the rotor 26 is connected to the outer circumference side of the hollow shaft 24. Thus, the first motor/generator 6, the power synthesizing mechanism 7 and the second motor/generator 9 are arranged concentrically with one another.

The speed change mechanism 8 is arranged in the axial direction of the input shaft 5 between the power synthesizing mechanism 7 and the second motor/generator 9, and is provided with the so-called "single pinion type planetary gear mechanism 8A". Specifically, this planetary gear mechanism 8A is equipped with a sun gear 29, a ring gear 30 arranged concentrically with the sun gear 29 and formed on the inner circumference portion of the annular member 22, and a carrier 32 holding a pinion gear 31 meshing with the sun gear 29 and the ring gear 30.

This carrier 32 is fixed on the transaxle case 4. On the outer circumference side of the annular member 22, moreover, there are mounted the inner rings of bearings 33 and 33A on the two axial sides of the counter drive gear 23. Moreover, the bearing 33 arranged on the side of the second motor/generator 9 is arranged in the space inside of the coil 28 in the radial direction of the hollow shaft 24. Thus, the power synthesizing mechanism 7 and the speed change mechanism 8 are disposed in the axial direction of the input shaft 5 in a space J1 between an arranging region L1 and an arranging region L2.

In the transaxle case 4, on the other hand, there is disposed a counter shaft 34 in parallel with the input shaft 5. On this counter shaft 34, there are formed a counter driven gear 35 and a final drive pinion gear 36. Moreover, the counter drive gear 23 and the counter driven gear 35 are made to mesh with each other. In the transaxle case 4, moreover, there is disposed a differential 37. This differential 37 is equipped with a final ring gear 39 formed on the outer circumference side of a differential case 38, a plurality of pinion gears 41 connected and fitted to the differential case 38 through a pinion shaft 40, side gears 42 meshing with a plurality of the pinion gears 41, and two front drive shafts 43 connected to the side gears 42. Front wheels 44 are connected to the individual front drive shafts 43. Thus in the transaxle case 4, there is constructed the so-called "transaxle", in which the speed change mechanism 8 and the differential 37 are assembled together.

Figure 2:
FIG. 2 is a conceptual diagram showing an arranging layout of parts in a power transmission route in the embodiment of the invention.

FIG. 2 is a side elevation showing a layout of the parts constructing the power transmission route shown in FIG. 1. In FIG. 2, the lefthand side indicates the forward of the vehicle, and the righthand side indicates the backward of the vehicle. As shown in FIG. 2, the center of rotation B1 of the counter shaft 34 is arranged backward of the center of rotation A1 of the crankshaft 2, the input shaft 5 and the hollow shafts 17 and 24, and the center of rotation C1 of the side gear 42 of the differential 37 is arranged backward of the rotation center B1. Moreover, the rotation center A1 is arranged at a lower position than that of the rotation center B1 and at a higher position than that of the rotation center C1.

Although not shown, there is provided an electronic control unit for controlling the entire vehicle. This electronic control unit is constructed of a microcomputer which is mainly composed of a processing unit (e.g., CPU or MPU), memory units (e.g., RAM and ROM) and an input/output interface. To this electronic control unit, there are inputted the signal of an ignition switch, the signal of an engine speed sensor, the signal of a brake switch, the signal of a vehicle speed sensor, the signal of an accelerator opening sensor, the signal of a shift position sensor, the signals of resolvers for detecting the rotation frequency of the first motor/generator 6 and the second motor/generator 9, and so on. From the electronic control unit, on the other hand, there are outputted the signals for controlling the intake air, the fuel injection rate and the ignition timing of the engine 1, the signals for controlling the outputs of the first motor/generator 6 and the second motor/generator 9, the signals for controlling the (not-shown) actuator to apply/release the clutch 11, and so on.

Here will be described the correspondences between the construction of the embodiment shown in FIG. 1 and the construction of the invention. The second motor/generator 9 corresponds to the electric motor of the invention; the first motor/generator 6 to the power generator of the invention; the crankshaft 2 and the hollow shaft 24 to the output shaft of the invention; the sun gear 18 to the first sun gear of the invention; the ring gear 19 to the first ring gear of the invention; the pinion gear 20 to the first pinion gear of the invention; and the carrier 21 to the first carrier of the invention.

Moreover: the planetary gear mechanism 7A corresponds to the first planetary gear mechanism of the invention; the sun gear 29 to the second sun gear of the invention; the ring gear 30 to the second ring gear of the invention; the pinion gear 31 to the second pinion gear of the invention; the carrier 32 to the second carrier of the invention; the planetary gear mechanism 8A to the second planetary gear mechanism of the invention; the bearing 33 to the first holding member of the invention; the input shaft 5 to the rotary member of the invention; the coil 28 of the second motor/generator 9 to at least portion of the electric motor of the invention; and the hollow shaft 17 and the rotor 14 to the rotary shaft of the power generator of the invention.

In the hybrid vehicle thus constructed, on the basis of the conditions such as the vehicle speed and the accelerator opening, the demand torque to be transmitted to the front wheels 44 is calculated, so that the engine 1, the clutch 11, the first motor/generator 6 and the second motor/generator 9 are controlled on the basis of the calculation result. When the torque outputted from the engine 1 is transmitted to the front wheels, the clutch 11 is applied. Then, the power (or the torque) of the crankshaft 2 is transmitted through the input shaft 5 to the carrier 21.

The torque transmitted to the carrier 21 is further transmitted through the ring gear 19, the annular member 22, the counter drive gear 23, the counter driven gear 35, the counter shaft 34, the final drive pinion gear 36 and the differential 37 to the front wheels 44 so that it establishes the drive force. When the torque of the engine 1 is transmitted to the carrier 21, on the other hand, the first motor/generator 6 could be caused to function as a power generator to charge an (not-shown) accumulator with the generated electric power.

Moreover, the second motor/generator 9 could be activated as an electric motor to transmit its power to the power synthesizing mechanism 7. When the power of the second motor/generator 9 is transmitted through the hollow shaft 24 to the sun gear 29 of the speed change mechanism 8, the carrier 32 acts as a reaction element so that the ring gear 30 rotates backward of the rotating direction of the sun gear 29 while being decelerated relative to the sun gear 29. Thus, the power of the engine 1 and the power of the second motor/generator 9 are inputted to and synthesized by the power synthesizing mechanism 7 so that the synthesized power is transmitted to the front wheels 44.

In the embodiment of FIGS. 1 and 2, the torque of the second motor/generator 9 can be amplified and transmitted to the power synthesizing mechanism 7 by decelerating its speed. It is, therefore, unnecessary to design the size or rating (e.g., the size of the second motor/generator 9 in the radial direction of the hollow shaft 24 and the length of the second motor/generator 9 in the axial direction of the hollow shaft 24) of the second motor/generator 9 itself in advance to a larger value, while being prepared for the case in which the output of the second motor/generator 9 has to be raised. Therefore, it is possible to reduce the size and weight of the second motor/generator 9.

Therefore, the radial and axial arranging spaces of the second motor/generator 9 are suppressed to improve the mountability of the transaxle case 4 on the vehicle, more specifically, the mountability in the transverse, longitudinal and vertical directions of the vehicle. Moreover, the speed change mechanism 8 makes it possible to suppress the increase more than the predetermined highest value in the rotation frequency of the second motor/generator 9 and to suppress the reduction in the durability of bearings or the like holding the hollow shaft 24.

Moreover, the bearing 33 holding the annular member 22 is arranged on the outer side of the annular member 22. Therefore, the arranging spaces for the power synthesizing mechanism 7 and the speed change mechanism 8 are shortened in the axial direction of the hollow shafts 17 and 24 so that the mountability of the transaxle case 4 in the transverse direction of the vehicle is better improved. Moreover, the bearing 33 is arranged on the inner side of the coil 28 in the radial direction of the hollow shaft 24. In other words, the bearing 33 is arranged by making use of the dead space inside of the coil 28 so that the arranging space for the second motor/generator 9 and the arranging space for the bearing 33 can be overlapped at least partially in the axial direction. Therefore, the arranging space for the transaxle case 4 in the transverse direction of the vehicle can be shortened to improve the mountability better.

Still moreover, the input shaft 5, the hollow shaft 17 and the hollow shaft 24 are concentrically arranged so that their arranging spaces in the radial direction are more narrowed to improve the mountability of the transaxle case 4 in the longitudinal or height direction of the vehicle. Furthermore, the first motor/generator 6 and the second motor/generator 9 are arranged at the different positions in the axial direction. In the axial direction of the input shaft 5, more specifically, the first motor/generator 6 and the second motor/generator 9 are so set at their arranged positions that their arranging regions L1 and L2 may not overlap. Even if the radial sizing (i.e., the external diameters) of the first motor/generator 6 and the second motor/generator 9 is set independently of their relative sizes, therefore, these two motor/generators 6 and 9 can be prevented from contacting with each other.

In the axial direction of the input shaft 5, moreover, the power synthesizing mechanism 7 and the speed change mechanism 8 are arranged in the space J1 which is formed to prevent the interference between the arranging region L1 of the first motor/generator 6 and the arranging region L2 of the second motor/generator 9. In other words, the space J1 between the first motor/generator 6 and the second motor/generator 9 also acts the arranging spaces for the power synthesizing mechanism 7 and the speed change mechanism 8. By making use of the space (or the dead space) formed in the transaxle case 4, therefore, the power synthesizing mechanism 7 and the speed change mechanism 8 can be arranged to suppress the transaxle case 4 from being large-sized in the axial and radial directions of the input shaft 5. Therefore, it is possible to prevent the deterioration in the mountability of the transaxle case 4 on the vehicle.

In case the power generating capacity or the torque capacity of the first motor/generator 6 is to be changed, there is not only a first method for changing the external diameter of the stator 15 but also a second method for changing the layer number of the electromagnetic steel sheets composing the rotor 14 and the stator 15. When this second method is adopted, the characteristics of the first motor/generator 6 can be changed by changing not the external diameter of the first motor/generator 6 but the axial length of the input shaft 5.

When the number of the electromagnetic steel sheets composing the rotor 14 and the stator 15 is changed, the length of the first motor/generator 6 in the axial direction of the input shaft 5 changes. By using the case cover 78 which is accordingly changed in the size such as the depth or length in the axial direction of the input shaft 5, therefore, it is possible to mount the case cover 78 and to assemble the transaxle as a whole.

In this case, it is unnecessary to change the shape and structure of the engine side housing 70. Specifically, the engine side housing 70 need not be changed even when the number of electromagnetic steel sheets of the first motor/generator 6 is changed. When the second method is adopted, moreover, the coil 16 is changed in its winding length but not in its winding diameter. Even when a plurality of first motor/generators 6 having different characteristics are to be manufactured by adopting the second method, moreover, it is possible to use all the electromagnetic steel sheets composing the rotor 14 and the stator 15 and the parts of the coil 16 commonly (or in series).

In case the power generating capacity or the torque capacity of the second motor/generator 9 is to be changed, on the other hand, there is not only a first method for changing the external diameter of the stator 27 but also a second method for changing the layer number of the electromagnetic steel sheets composing the rotor 26 and the stator 27. When this second method is adopted, the characteristics of the second motor/generator 9 can be changed by changing not the external diameter of the second motor/generator 9 but the axial length of the input shaft 5.

When this second method is adopted, there is used the rear cover 72 which has been changed in the size such as the depth or length in the axial direction of the input shaft 5 in accordance with the change in the length of the second motor/generator 9 in the axial direction of the input shaft 5. Therefore, it is possible to mount the rear cover 72 on the extension housing 71 and to assemble the transaxle as a whole.

In this case, it is unnecessary to change the shape and structure of the extension housing 71. Specifically, the first extension housing 71 need not be changed even when the number of electromagnetic steel sheets of the second motor/generator 9 is changed. When the second method is adopted, moreover, the coil 28 is changed in its winding length but not in its winding diameter. Even when a plurality of second motor/generators 9 having different characteristics are to be manufactured by adopting the second method, moreover, it is possible to use all the electromagnetic steel sheets composing the rotor 26 and the stator 27 and the parts of the coil 28 commonly (or in series).

When the second method is adopted for manufacturing various first motor/generators 6 and second motor/generators 9 having different characteristics in accordance with various conditions (e.g., a vehicle kind, specifications, a power generation demand or a drive demand), it is unnecessary to change the steps and facilities for assembling the transaxle. Even when the first and second motor/generators 6 and 9 having different axial lengths are manufactured and assembled with the transaxle case 4, therefore, a common manufacture line can tend them sufficiently to improve the productivity of the transaxle while suppressing the rise in the production cost.

Figure 3:
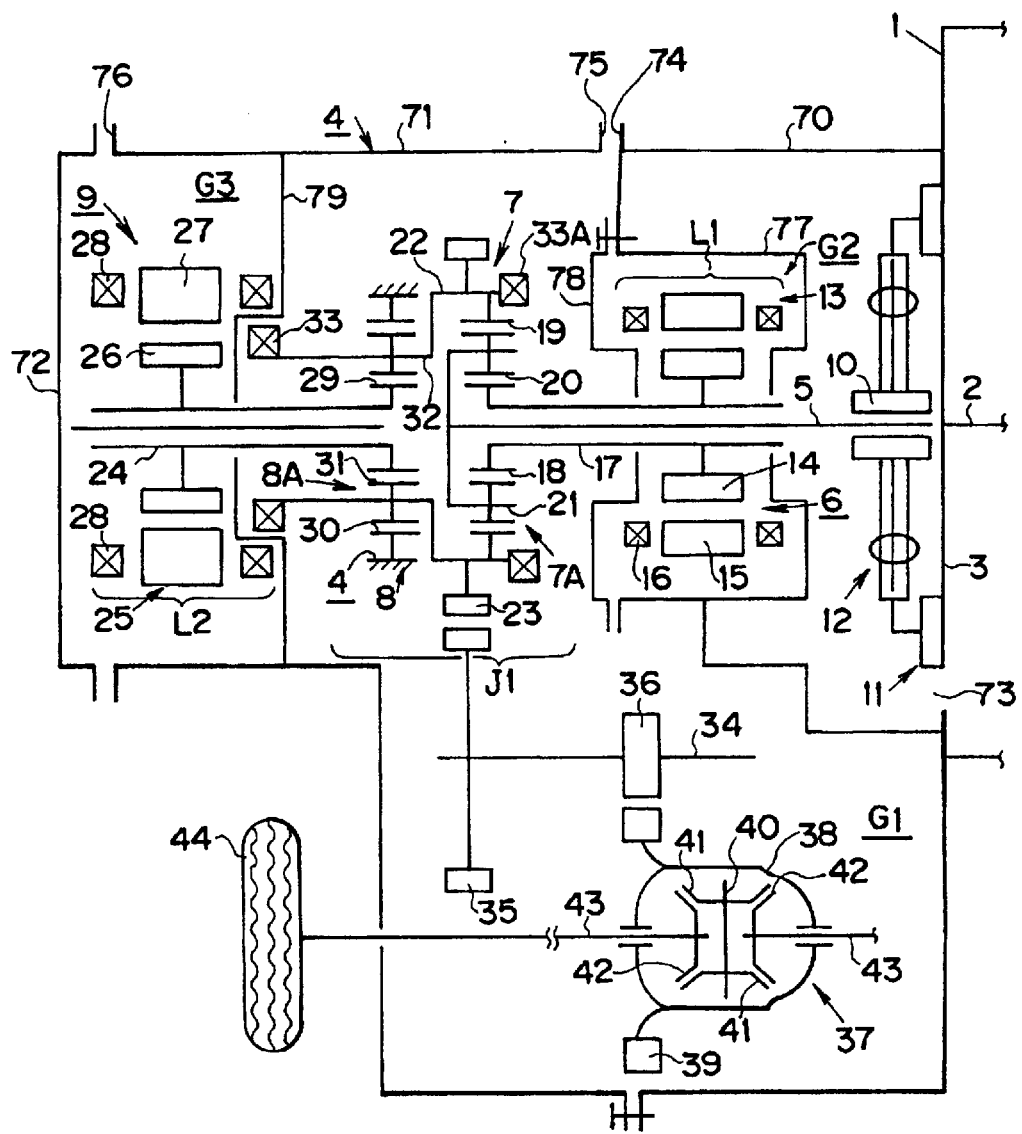
FIG. 3 is a skeleton diagram showing another embodiment of a power transmission system of the invention.

FIG. 3 is a skeleton diagram showing another embodiment of the invention. In FIG. 3, the description of the components similar to those of FIG. 1 will be omitted by designating them by the same reference numerals as those of FIG. 1. In FIG. 3, the annular member 22 and the carrier 32 of the planetary gear mechanism 8A are so connected that they can rotate together. Moreover, the ring gear 30 of the planetary gear mechanism 8A is fixed on the side of the transaxle case 4. Still moreover, the carrier 32 is rotatably held by the bearing 33. This bearing 33 has its external diameter set smaller than the internal diameter of the coil 28 of the second motor/generator 9. Therefore, the bearing 33 is arranged on the inner side than the coil 28 of the second motor/generator 9.

When the power is outputted from the second motor/generator 9 in the embodiment of FIG. 3, the ring gear 30 of the planetary gear mechanism 8A acts as the reaction element so that the carrier 32 and the annular member 22 are decelerated together with respect to the sun gear 29 and are rotated in the same direction as that of the sun gear 29. In short, the torque of the second motor/generator 9 is amplified and transmitted to the power synthesizing mechanism 7. Thus in the embodiment of FIG. 3, too, actions and effects similar to those of FIG. 1 can be attained because of the construction substantially similar to that of the embodiment of FIG. 1.

Figure 4:
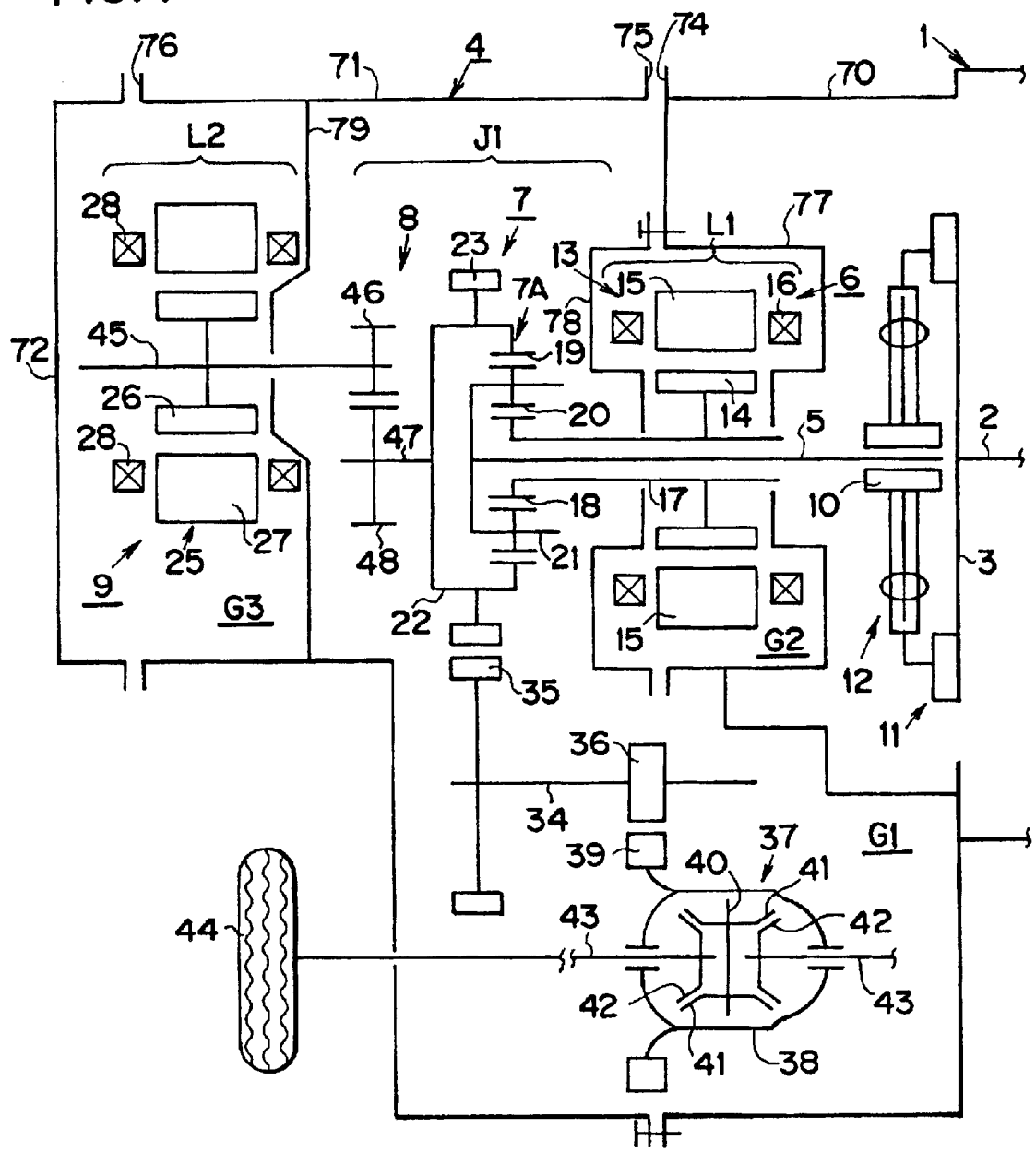
FIG. 4 is a skeleton diagram showing still another embodiment of a power transmission system of the invention.

FIG. 4 is a skeleton diagram showing still another embodiment of the invention. In FIG. 4, the description of the components similar to those of FIG. 1 will be omitted by designating them by the same reference numerals as those of FIG. 1. In FIG. 4, the rotor 26 of the second motor/generator 9 is connected to the outer circumference portion of a shaft 45. This shaft 45 is arranged generally horizontally in the transverse direction of the vehicle. The axis of the shaft 45 and the axis of the input shaft 5 and the hollow shaft 17 are radially displaced from each other. In other words, the shaft 45 is radially offset with respect to the input shaft 5 and the hollow shaft 17.

Specifically, the first motor/generator 6 and the second motor/generator 9 are arranged at different positions in the axial direction of the shaft 45, the input shaft 5 and the hollow shaft 17. More specifically, the first motor/generators 6 and the second motor/generator 9 are so set in their arranged positions that the arranging region of the first motor/generator 6 and the arranging region of the second motor/generator 9 may not overlap in the axial direction. Moreover, the rotation center of the first motor/generator 6 and the rotation center of the second motor/generator 9 are offset in the radial directions of the individual shafts. Moreover, a gear 46 is formed at the end portion of the shaft 45 on the side of the power synthesizing mechanism 7.

To the annular member 22 of the power synthesizing mechanism 7, on the other hand, there is integrally connected a shaft 47. This shaft 47, the input shaft 5 and the hollow shaft 17 are arranged on the common axis. On the shaft 47, moreover, there is formed a gear 48, which meshes with the gear 46. These gears 46 and 48 are so constructed that the gear ratio of the case in which the power is transmitted from the gear 46 to the gear 48 may be at "1" or more. Specifically, in the embodiment of FIG. 4, the gears 46 and 48 and the shaft 47 construct the speed change mechanism 8.

Figure 5:
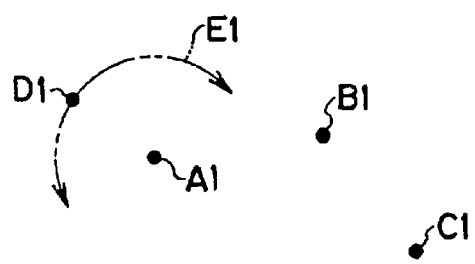
FIG. 5 is a conceptual diagram showing an arranging layout of parts in the power transmission system of the invention.

FIG. 5 is a side elevation showing one example of the layout of the parts shown in FIG. 4. In FIG. 5, the description of the components similar to those of FIG. 2 will be omitted by designating them by the same reference numerals as those of FIG. 2. In FIG. 5, the center of rotation D1 of the second motor/generator 9 and the shaft 45 is arranged on a virtual arc E1 around the rotation center A1.

Here will be described the actions of the embodiment of FIG. 4. When the power of the second motor/generator 9 is transmitted through the shaft 45 to the gear 46, the shaft 47 rotates according to the gear ratio between the gear 46 and the gear 48. In short, the torque of the second motor/generator 9 is amplified and transmitted to the power synthesizing mechanism 7. In the embodiment of FIG. 4, therefore, there can also be attained effects similar to those of the embodiment of FIG. 1. Here in the embodiment of FIG. 4, the components similar to those of the embodiment of FIG. 1 can attain actions and effects similar to those of the embodiment of FIG. 1.

In the embodiment of FIG. 4, moreover, the first motor/generator 6 and the second motor/generator 9 are arranged at different positions in the transverse direction of the vehicle. More specifically, the arranged positions of the first motor/generators 6 and the second motor/generator 9 are so set that the arranging region L1 of the first motor/generator 6 and the arranging region L2 of the second motor/generator 9 may not overlap in the axial direction. Therefore, no interference is caused in the radial direction between the first motor/generator 6 and the second motor/generator 9. As illustrated in FIG. 5, therefore, the arranged position of the rotation center D1 of the second motor/generator 9, i.e., the position and height in the longitudinal direction of the vehicle can be arbitrarily set on the virtual arc E1 in accordance with the mounting space. Therefore, it is facilitated to design the layout of the second motor/generator 9 freely, and the mountability of the transmission is improved.

Figure 6:
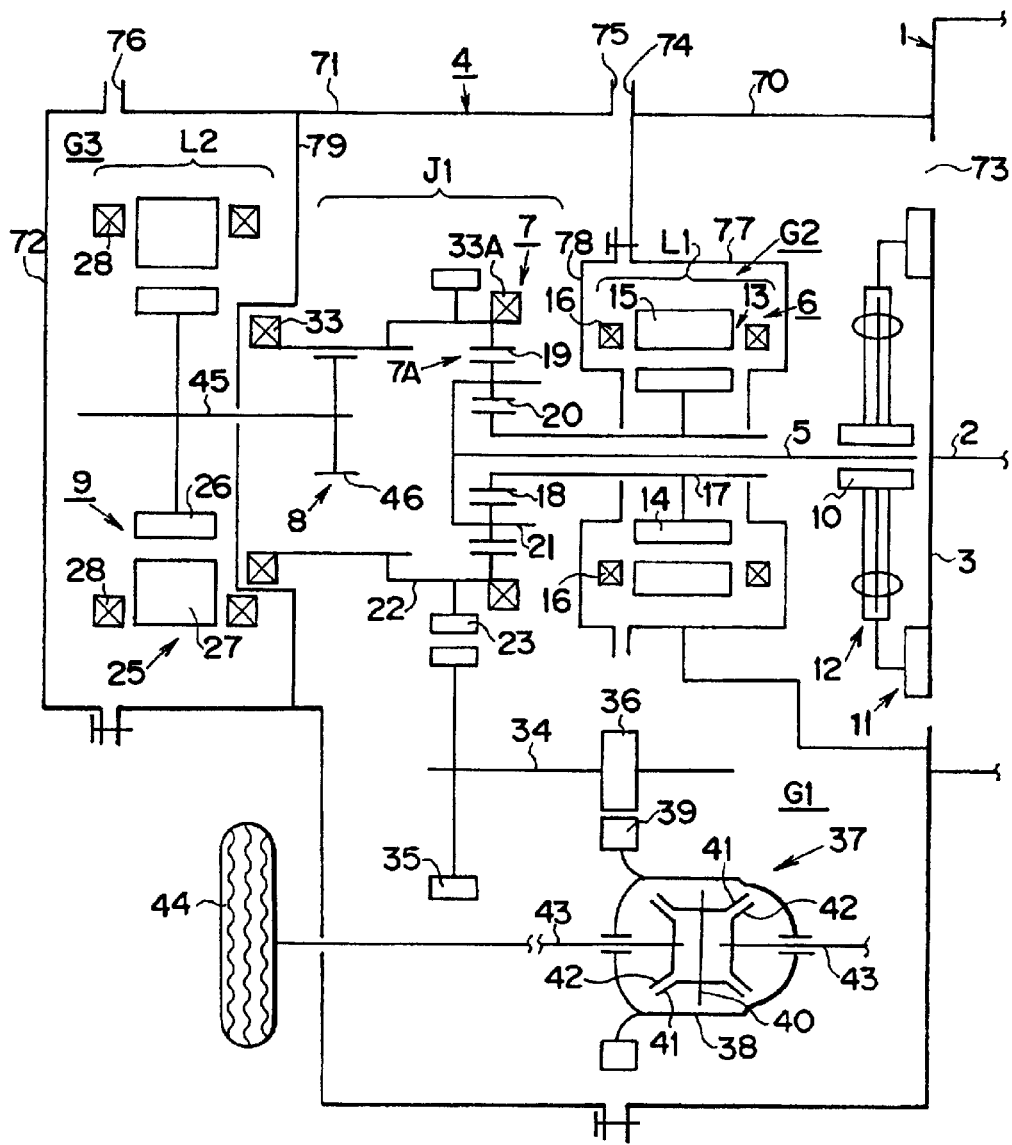
FIG. 6 is a skeleton diagram showing a further embodiment of a power transmission system of the invention.

FIG. 6 is a skeleton diagram showing a further embodiment of the invention. In FIG. 6, the description of the components similar to those of FIGS. 1 and 4 will be omitted by designating them by the same reference numerals as those of FIGS. 1 and 4. In FIG. 6, the ring gear 30 formed on the annular member 22 meshes with the gear 46 of the shaft 45. The gear 46 and the ring gear 30 are so constructed that the gear ratio of the case in which the power is transmitted from the gear 46 to the ring gear 30 may be at "1" or more. These gear 46 and ring gear 30 construct the speed change mechanism 8.

There is also provided the bearing 33 for holding the outer circumference of the end portion of the annular member 22 on the side of the second motor/generator 9. This bearing 33 has a smaller external diameter than that of the coil 28 of the second motor/generator 9. Therefore, the arranged position of the bearing 33 in the radial direction is located between the shaft 45 and the coil 28. In FIG. 6, the layout of the individual parts in the radial direction is similar to that of FIG. 5. Here will be described the corresponding relations between the construction of the embodiment of FIG. 6 and the construction of this invention. The ring gear 30 corresponds to the internal gear of the invention; the gear 46 to the first gear of the invention; and the bearing 33 to the second holding member of the invention.

The actions of the embodiment of FIG. 6 will be described in the following. When the power of the second motor/generator 9 is transmitted through the shaft 45 to the gear 46, the torque is transmitted through the ring gear 30 to the annular member 22 so that the annular member 22 rotates while being decelerated relative to the shaft 45. In short, the torque of the second motor/generator 9 is amplified and transmitted to the power synthesizing mechanism 7. In the embodiment of FIG. 6, therefore, effects similar to those of the embodiment of FIG. 1 can also be attained. Here in FIG. 6, the components similar to those of FIGS. 1, 4 and 5 can attain actions and effects similar to those of FIGS. 1, 4 and 5.

According to the embodiment of FIG. 6, moreover, the gear ratio necessary for amplifying the torque of the second motor/generator 9 can be set by the speed change mechanism 8, and the gear 46 is arranged on the inner side of the ring gear 30. Therefore, the arranging spaces for the power synthesizing mechanism 7 and the speed change mechanism 8 in the radial direction can be reduced to improve the mountability of the transaxle case 4 better.

Here, the inter-axis distance between the shaft of the speed change mechanism 8 and the shaft of the second motor/generator 9 is restricted by the restriction on the arranging spaces for the components. In case both the gear on the speed change mechanism side and the gear on the second motor/generator side are made of external gears, therefore, it is probable that the external diameter of the gear connected to the second motor/generator cannot be enlarged. In this case, there arises a problem that it is difficult to give a sufficient strength to the gear on the second motor/generator side. Another problem is that the meshing percentage between the gear on the second motor/generator side and the gear on the speed change mechanism side cannot be enlarged more than a predetermined value thereby to cause the gear noise.

In the embodiment of FIG. 6, on the contrary, the gear 46 is arranged on the inner side of the ring gear 30. With this construction, therefore, the gear 46 can be enlarged in its external diameter to enhance its strength without enlarging the arranging space of the speed change mechanism 8 in the radial direction. At the same time, the meshing percentage of the gear 46 and the ring gear 30 can be set to a large value to suppress the generation of the gear noise.

In the embodiment of FIG. 6, moreover, on the outer side of the annular member 22 having the ring gear 30, there is mounted the bearing 33 for holding the annular member 22 rotatably. Therefore, the arranging spaces for the annular member 22 and the bearing 33 in the axial direction are reduced to improve the mountability better. In the radial direction of the second motor/generator 9, moreover, the bearing 33 is arranged on the inner side of the coil 28 so that the arranging spaces for the second motor/generator 9 and the bearing 33 in the transverse direction of the vehicle (or in the axial direction) are reduced to improve the mountability better.

Figure 7:
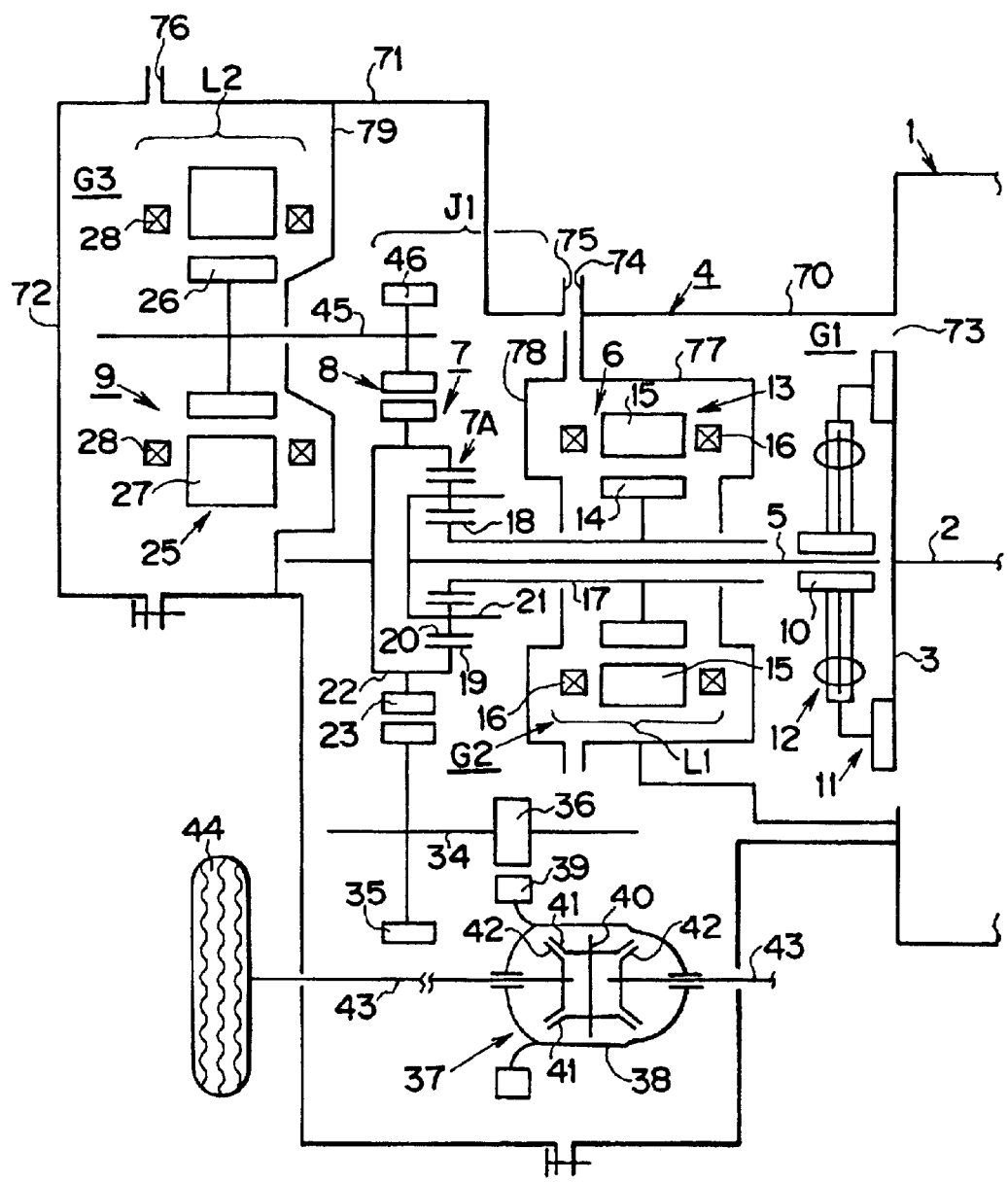
FIG. 7 is a skeleton diagram showing a further embodiment of a power transmission system of the invention.

FIG. 7 is a skeleton diagram showing a further embodiment of the invention. In FIG. 7, the description of the components similar to those of FIGS. 1 and 4 will be omitted by designating them by the same reference numerals as those of FIGS. 1 and 4. In FIG. 7, the gear 46 and the gear 23 mesh with each other. These gears 46 and 23 are so constructed that the gear ratio of the case in which the power is transmitted from the gear 46 to the gear 23 may be at "1" or more. These gears 46 and 23 construct the speed change mechanism 8. In FIG. 7, the layout of the individual parts in the radial direction is similar to that of FIG. 5. The corresponding relations between the construction of the embodiment of FIG. 7 and the construction of this invention will be described in the following. The gear 23 corresponds to the second gear of the invention, and the gear 46 corresponds to the third gear of the invention.

Here will be described the actions of the embodiment of FIG. 7. When the power of the second motor/generator 9 is transmitted through the shaft 45 to the gear 46, the annular member 22 is decelerated and rotated according to the gear ratio between the gear 46 and the gear 23. In short, the torque of the second motor/generator 9 is amplified and transmitted to the power synthesizing mechanism 7. In the embodiment of FIG. 7, therefore, there can also be attained effects similar to those of the embodiment of FIG. 1. Here in FIG. 7, the components similar to those of FIGS. 1, 4 and 5 can attain actions and effects similar to those of FIGS. 1, 4 and 5.

Figure 8:
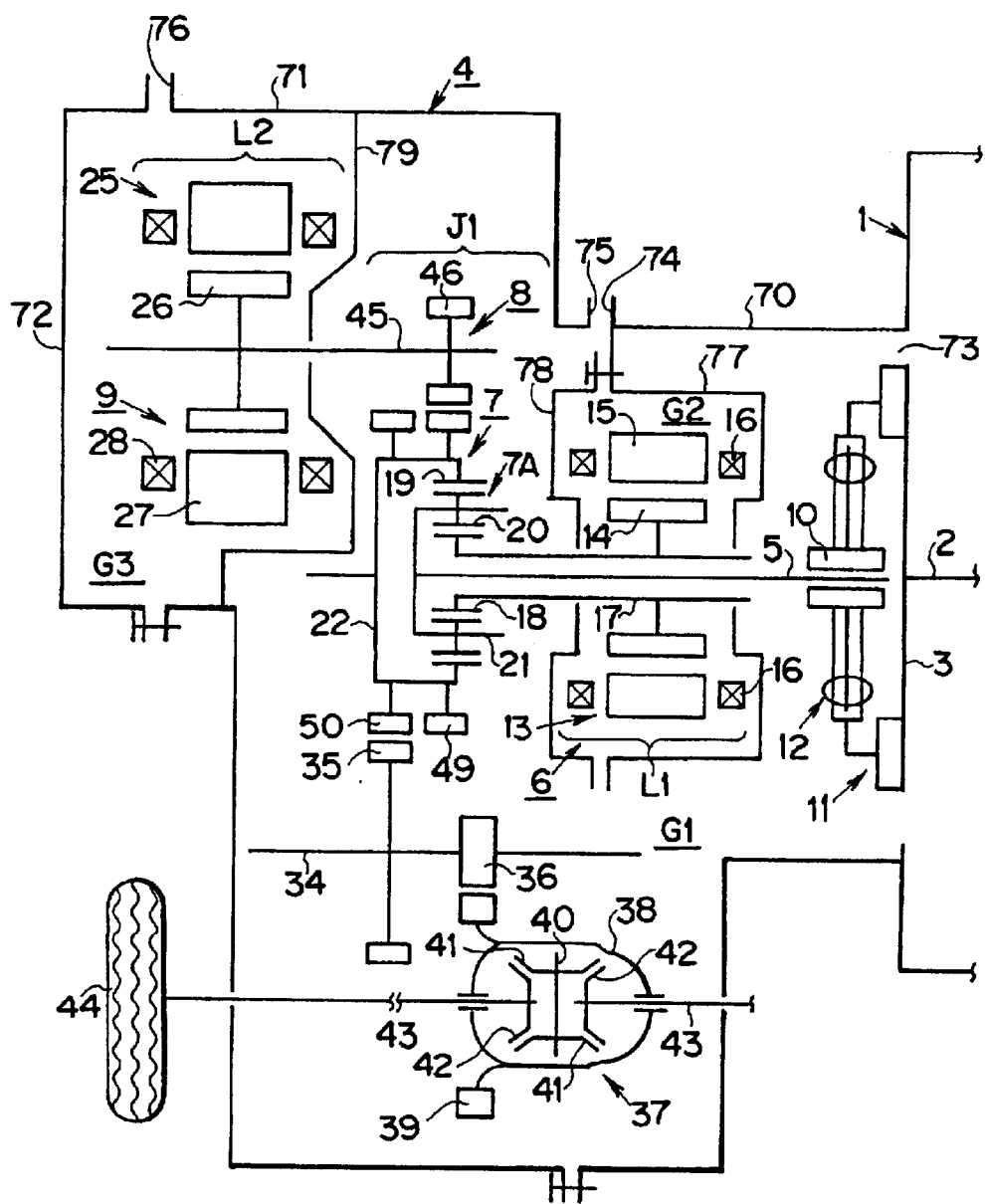
FIG. 8 is a skeleton diagram showing a further embodiment of a power transmission system of the invention.

FIG. 8 is a skeleton diagram showing a further embodiment of the invention. In FIG. 8, the description of the components similar to those of FIGS. 1, 4 and 7 will be omitted by designating them by the same reference numerals as those of FIGS. 1, 4 and 7. On the outer circumference of the annular member 22, as shown in FIG. 8, there are arranged on a common axis a gear 49 and a counter drive gear 50. Of these, the gear 49 meshes with the gear 46.

These gears 46 and 49 are so constructed that the gear ratio of the case in which the power is transmitted from the gear 46 to the gear 49 may be at "1" or more. These gears 46 and 49 construct the speed change mechanism 8. Moreover, the counter drive gear 50 and the counter driven gear 35 mesh with each other. In FIG. 8, the layout of the individual parts is similar to that of FIG. 5. The corresponding relations between the construction of the embodiment of FIG. 8 and the construction of this invention will be described in the following. The gear 49 corresponds to the second gear of this invention; the gear 46 to the third gear of the invention; and the counter drive gear 50 to the fourth gear of the invention.

Here will be described the actions of the embodiment of FIG. 8. When the power of the second motor/generator 9 is transmitted through the shaft 45 to the gear 46, the annular member 22 is decelerated to rotate according to the gear ratio between the gear 46 and the gear 49. Specifically, the torque of the second motor/generator 9 is amplified and transmitted to the power synthesizing mechanism 7. Moreover, the power of the engine 1 is transmitted like the embodiment of FIG. 1 to the annular member 22. When the power of the second motor/generator 9 is transmitted to the annular member 22, the power of the engine 1 and the power of the second motor/generator 9 are synthesized by the annular member 22 and are transmitted through the counter drive gear 50 to the counter driven gear 35. Thus, in the embodiment of FIG. 8, too, there can be attained effects similar to those of the embodiment of FIG. 1. Here in FIG. 8, the components similar to those of FIGS. 1, 4 and 5 can attain actions and effects similar to those of FIGS. 1, 4 and 5.

In the embodiment of FIG. 8, moreover, there are separately provided the gear 49 forming part of the speed change mechanism 8, and the counter drive gear 50 for transmitting the powers of the engine 1 and the second motor/generator 9, after synthesized, to the counter driven gear 35. Therefore, it is possible to set separately the gear ratio between the gear 46 and the gear 49 and the gear ratio between the counter drive gear 50 and the counter driven gear 35. Therefore, it is possible to tune the fuel consumption rate of the engine 1 and the power performance of the vehicle arbitrarily.

Figure 9:
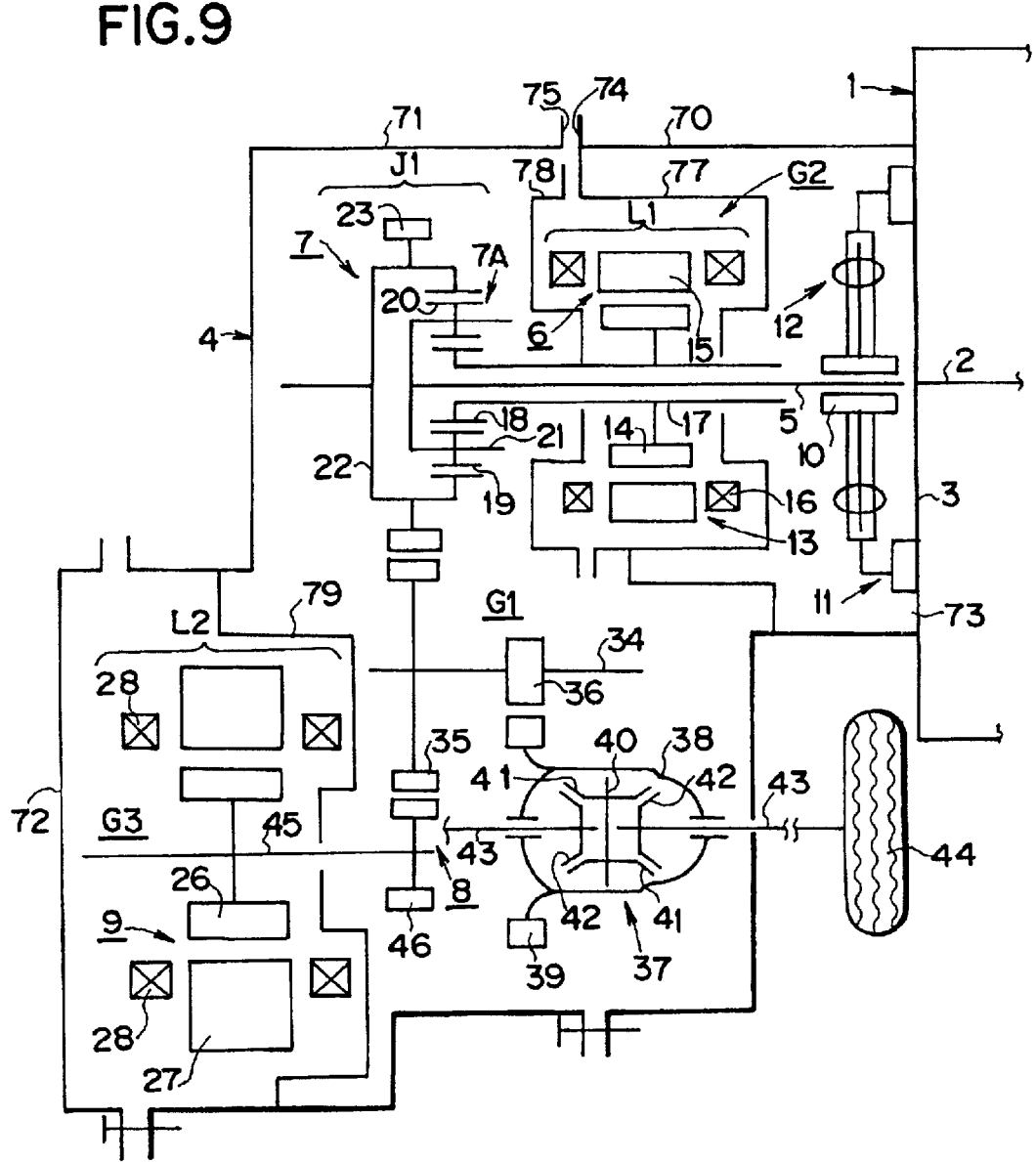
FIG. 9 is a skeleton diagram showing a further embodiment of a power transmission system of the invention.

FIG. 9 is a skeleton diagram showing a further embodiment of the invention. In FIG. 9, the description of the components similar to those of FIGS. 1 and 4 will be omitted by designating them by the same reference numerals as those of FIGS. 1 and 4. In FIG. 9, the counter drive gear 23, the gear 46 and the counter driven gear 35 mesh with each other. The gear 46 and the counter driven gear 35 are so constructed that the gear ratio of the case in which the power is transmitted from the gear 46 to the counter driven gear 35 may be at "1" or more. These gears 46 and counter driven gear 35 construct the speed change mechanism 8.

Figure 10:
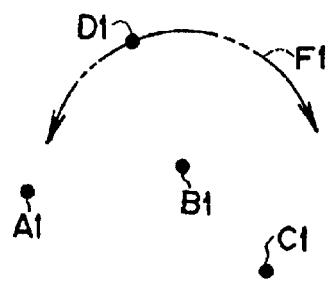
FIG. 10 is a conceptual diagram showing an arranging layout of parts in the power transmission system of the invention.

The layout of the individual parts in the radial direction, as corresponding to those of the embodiment of FIG. 9, is shown in FIG. 10. In FIG. 10, the description of components similar to those of FIGS. 2 and 5 will be omitted by designating them by the same reference numerals as those of FIGS. 2 and 5. In the embodiment of FIG. 9, the gear 46 of the shaft 45 and the counter driven gear 35 mesh with each other. Moreover, the first motor/generator 6 and the second motor/generator 9 are arranged at different positions in the axial direction.

More specifically, the first motor/generator 6 and the second motor/generator 9 are so set in their arranged positions that the arranging region L1 of the first motor/generator 6 and the arranging region L2 of the second motor/generator 9 may not overlap. Therefore, the rotation center D1 can be arbitrarily set on a virtual arc F1 with reference to the rotation center B1. Here in this embodiment of FIG. 9, the first planetary gear mechanism 7A, the gear 23 and the counter driven gear 35 construct the power synthesizing mechanism 7.

Here will be described the corresponding relations between the construction of the embodiment of FIG. 9 and the construction of this invention. The gear 23 corresponds to the seventh gear of the invention; the counter driven gear 35 to the eighth gear of the invention; and the gear 46 to the ninth gear of the invention.

The actions of the embodiment of FIG. 9 will be described in the following. The power of the engine 1 is transmitted, as in the embodiment of FIG. 1, to the first planetary gear mechanism 7A and further through the annular member 22 and the counter drive gear 23 to the counter driven gear 35. When the power of the second motor/generator 9 is transmitted through the shaft 45 to the gear 46, on the other hand, the rotating speed of the gear 46 is decelerated and the power is transmitted to the counter shaft 34. In short, the torque of the second motor/generator 9 is amplified and transmitted to the counter shaft 34.

Moreover, the power of the engine 1 and the power of the second motor/generator 9 are synthesized by the counter driven gear 35 so that the synthesized power is transmitted to the counter shaft 34. Thus, the embodiment of FIG. 9 can also attain effects similar to those of the embodiment of FIG. 1. Here in FIG. 9, components similar to those of FIGS. 1 and 4 can attain actions and effects similar to those of FIGS. 1 and 4.

Moreover, the embodiment of FIG. 9 is constructed such that the first motor/generator 6 and the second motor/generator 9 are arranged at different positions in the axial direction, and such that the gear 46 and the counter driven gear 35 mesh with each other. Therefore, the rotation center of the second motor/generator 9 can be arbitrarily set on the virtual arc F1 illustrated in FIG. 10. Therefore, it is facilitated to design the layout of the second motor/generator 9 around the counter shaft 34 freely, and the mountability of the transmission is improved. Here, it is natural that the relative position relations between the input shaft 5 and the shaft 45 are so set that the gear 46 and the counter drive gear 23 may not contact with each other.

Here, the individual embodiments thus far described can be basically adopted separately of one another, but at least their portions of each embodiments can also be interchanged with or added to one another. The foregoing individual embodiments have been described on the FF vehicle in which at least one of the powers of the engine 1 and the second motor/generator 9 is transmitted to the front wheels 44. However, this invention can also be applied to either: an FR vehicle (Front-engine/Rear-drive vehicle), in which at least one of the powers of the engine 1 and the second motor/generator 9 is transmitted to the (not-shown) rear wheels; or a four-wheel drive vehicle in which at least one of the powers of the engine 1 and the second motor/generator 9 can be transmitted to the front wheels and the rear wheels. In case the individual embodiments are thus applied to the FR vehicle or the four-wheel drive vehicle, it is natural that the power transmission member such as the output shaft of the individual drive sources and the input shaft or the counter shaft is arranged to have its axis in the longitudinal direction of the vehicle.

Moreover, the aforementioned individual embodiments are constructed such that the gear ratio, i.e., the ratio between the rotating speeds of the input member and the output member to be changed by the speed change mechanism may take a constant (or fixed) value. It is, however, possible to adopt a speed change mechanism capable of changing the gear ratio. This speed change mechanism may be exemplified by either a discontinuous transmission or a continuously variable transmission, as is well known in the art. Moreover, this invention can also be applied to a vehicle in which the output shafts of the engine and the second motor/generator are arranged toward the longitudinal direction of the vehicle.

Figure 11:
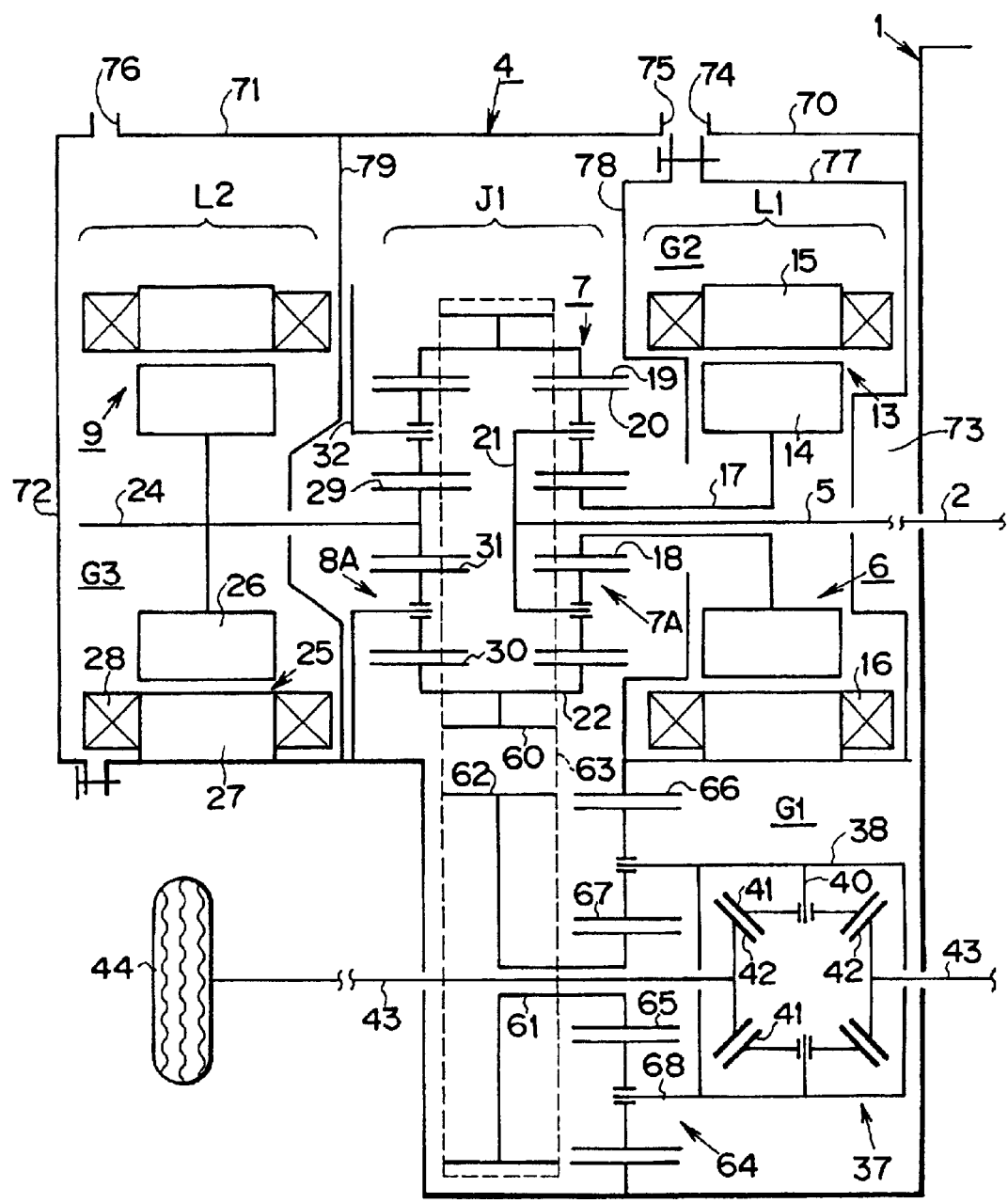
FIG. 11 is a skeleton diagram showing a further embodiment of a power transmission system of the invention.

FIG. 11 is a skeleton diagram showing a further embodiment. In FIG. 11 the description of the same portions of the components as those of FIG. 1 will be omitted by designating them by the same reference numerals as those of FIG. 1. Around the outer circumference portion of the annular member 22, there is formed a drive sprocket 60. On the outer circumference portion of the front drive shaft 43, on the other hand, there is rotatably fitted a hollow shaft 61. This hollow shaft 61 and the front drive shaft 43 can rotate relative to each other, and a driven sprocket 62 is formed in the hollow shaft 61. Moreover, a chain 63 is made to run on the drive sprocket 60 and the driven sprocket 62.

Moreover, the driven sprocket 62 and the differential 37 are coupled in a power transmitting manner by a planetary gear mechanism 64. This planetary gear mechanism 64 is equipped with a sun gear 65 formed on the hollow shaft 61, a ring gear 66 fixed on the transaxle case 4, and a carrier 68 holding a pinion gear 67 meshing with the sun gear 65 and the ring gear 66. This carrier 68 and the differential case 38 are so coupled as to rotate together. Here: the drive sprocket 60 corresponds to the output member of this invention; the driven sprocket 62 to the intermediate rotary member of the invention; the planetary gear mechanism 64 to the decelerating planetary gear mechanism of the invention; and the chain 63 to the wound transmission member of the invention.

In the embodiment of FIG. 11, the same components as those of FIG. 1 can attain actions and effects similar to those of the embodiment of FIG. 1. In the embodiment of FIG. 11, moreover, the power transmission is made in the following manner between the annular member 22 and the differential 37. In case at least one of the powers of the engine 1 and the motor/generator 9 is transmitted to the annular member 22, the torque of the annular member 22 is transmitted through the drive sprocket 60, the chain 63, the driven sprocket 62 and the hollow shaft 61 to the sun gear 65 of the planetary gear mechanism 64. Then, the ring gear 66 is fixed so that the carrier 68 and the differential case 38 are decelerated to rotate relative to the sun gear 65. Here, the rotating direction of the sun gear 65 is identical to that of the carrier 68 and the differential case 38.

In the embodiment of FIG. 11, moreover, the hollow shaft 24 and the input shaft 5 are arranged on the common axis, and the hollow shaft 24, the input shaft 5 and the front drive shaft 43 are arranged in parallel with one another. From the embodiment of FIG. 11, moreover, there is omitted the counter shaft 34 which has been described in the embodiments of FIGS. 1 to 10, so that the number of parts can be accordingly reduced to contribute to the size reduction and the light weight.

Here in the power transmission system shown in FIGS. 3, 4, 6 and 8, the counter drive gears 23 and 50, the counter driven gear 35, the counter shaft 34, the final drive pinion gear 36 and the ring gear 39 can also be replaced by the drive sprocket 60, the driven sprocket 62, the chain 63 and the planetary gear mechanism 64 of FIG. 11.

Here will be enumerated the constructions characterizing this invention, as has disclosed on the basis of the foregoing specific embodiments. According to first means, specifically, there is provided a transaxle unit which comprises: a power synthesizing mechanism for synthesizing the powers of an engine and an electric motor to output the synthesized power; a speed change mechanism for changing the rotating speed of said electric motor to transmit the motor torque to said power synthesizing mechanism; a power generator connected in a power transmitting manner to said power synthesizing mechanism; and a case (or a transaxle case) for housing said electric motor and said power generator. The transaxle unit is characterized in that there are formed a plurality of kinds of covers (i.e., a rear cover and a case cover) which have different sizes in said axial direction in connection with at least one of the size changes of said electric motor and said power generator in the axial direction of the output shaft of said electric motor and the rotary shaft of said power generator, and which are to be attached to said case.

According to second means, there is provided a transaxle unit assembling method for mounting in a case (or a transaxle case): a power synthesizing mechanism for synthesizing the powers of an engine and an electric motor to output the synthesized power; a speed change mechanism for changing the rotating speed of said electric motor to transmit the motor torque to said power synthesizing mechanism; and a power generator connected in a power transmitting manner to said power synthesizing mechanism. The transaxle unit assembling method is characterized in that a plurality of kinds of covers (i.e., a rear cover and a case cover), which have different sizes in said axial direction in connection with at least one of the size changes of said electric motor and said power generator in the axial direction of the output shaft of said electric motor and the rotary shaft of said power generator, and which are to be attached to said case, are attached to said case.

What is claimed is:

1. A power transmission system, comprising:

an engine;

an electric motor;

a power synthesizing mechanism for synthesizing powers outputted from the engine and the electric motor, which includes a first planetary gear mechanism having a first sun gear, a first ring gear arranged on the outer side of said first sun gear, and a first carrier for holding a first pinion gear meshing with said first sun gear and said first ring gear;

a power generator having a fixed stator and an output portion connected to an input portion of the synthesizing mechanism;

a speed change mechanism for changing the rotating speed of said electric motor to transmit a torque of the electric motor to said power synthesizing mechanism, which includes a second planetary gear mechanism having a second sun gear, a second ring gear arranged on the outer side of said second sun gear, and a second carrier for holding a second pinion gear meshing with said second sun gear and said second ring gear;

an arranging region for said electric motor and an arranging region for said power generator in the axial directions of the output shaft of said electric motor and the rotary shaft of said power generator, a fixing mechanism for increasing the torque of said electric motor by fixing any of said second sun gear, said second ring gear and said second carrier, to transmit the increased torque to said power synthesizing mechanism; wherein said arranging regions do not overlap on each other;

the first carrier of said first planetary gear mechanism and the engine are connected to each other;

said electric motor and the second sun gear of said second planetary gear mechanism are connected to each other;

the second carrier of said second planetary gear mechanism is fixed, and the first ring gear of said first planetary gear mechanism and the second ring gear of said second planetary gear mechanism are connected to each other.

2. A power transmission system according to claim 1, wherein the output shaft of said electric motor is arranged in the transverse direction of a vehicle.

3. A power transmission system according to claim 1, further comprising:

a rotary member for connecting said engine and said first carrier and is arranged on the same axis as the output shaft of said electric motor.

4. A power transmission system according to claim 1, further comprising:
a second gear made rotatable together with said first ring gear,
wherein the output shaft of said engine is connected to said first carrier, and
wherein said speed change mechanism includes said second gear, and a third gear for transmitting the power of said electric motor to said second gear.

5. A power transmission system according to claim 1, further comprising:
a fourth gear made rotatable together with said first ring gear; and
a fifth gear made rotatable together with said fourth gear,
wherein the output shaft of said engine is connected to said first carrier,
wherein said speed change mechanism includes said fourth gear, and
a sixth gear for transmitting the power of said electric motor to said fourth gear, and
wherein the power of said first ring gear and the power of said fourth gear are synthesized so that the synthesized power is transmitted through said fifth gear to wheels.

6. A power transmission system according to claim 1, further comprising:
a seventh gear made rotatable together with said first ring gear; and
an eighth gear mesh with said seventh gear,
wherein said speed change mechanism includes said eighth gear, and
a ninth gear for transmitting the power of said electric motor to said eighth gear, and
wherein the power of said seventh gear and the power of said ninth gear are synthesized so that the synthesized power is transmitted through said eighth gear to wheels.

7. A power transmission system comprising:
an engine;
an electric motor;
a power synthesizing mechanism for synthesizing powers outputted from the engine and the electric motor, which includes a first planetary gear mechanism having a first sun gear, a first pinion gear meshing with said first sun gear and said first ring gear;
a power generator having an output portion connected to an input portion of the synthesizing mechanism;
a speed change mechanism for changing the rotating speed of said electric motor to transmit a torque of the electric motor to said power synthesizing mechanism, which includes a second planetary gear mechansim having a second sun gear, a second ring gear arranged on the outer side of said second sun gear, and a second carrier for holding a second pinion gear meshing with said second ring gear;
an arranigin region for said electric motor and an arranging region for said power generator in the axial directions of the output shaft of said electric motor and the rotary shaft of said power generator, wherein said arranging regions do not overlap on each other;
a fixing mechansim for increasing the torque of said electric motor by fixing any of said second sun gear, said second ring gear and said second carrier, to transmit the increased torque to said power synthesizing mechanism; and
a first holding member for holding the first ring gear of said first planetary gear mechanism and the second ring gear of said second planetary gear mechanism rotatably, and arranged on the outer side of said first ring gear and said second ring gear.

8. A power transmission system according to claim 7, further comprising:
an arranging region for said first holding member and an arranging region for said electric motor,
wherein at least a portion of the arranging region for said first holding member and at least a portion of the arranging region for said electric motor overlap on each other in the axial direction of the output shaft of said electric motor.

9. A power transmission system comprising:
an engine;
an electric motor;
a power synthesizing mechanism for synthesizing powers outputted from the engine and the electric motor;
a power generator having an output portion connected to an input portion of the synthesizing mechanism;
a speed change mechanism for changing the rotating speed of said electric motor to transmit a torque of the electric motor to said power synthesizing mechanism;
an arranging region for said electric motor and an arranging region for said power generator in the azial directions of the output shaft of said electric motor and the rotary shaft of said poer generator;
a rotary member offset in the radial direction with respect to the output shaft of said electric motor and connected to an engine,
wherein said arranging regions do not overlap on the other.

10. A power transmission system according to claim 9, further comprising,
a first gear connected to the output shaft of said electric motor, and
wherein said speed change mechanism includes an internal gear, and
wherein said first gear is arranged in the inside space of said internal gear and meshes with said internal gear.

11. A power transmission system according to claim 10, further comprising:
a second holding member for holding said internal gear rotatably and arranged on the outer side of said internal gear.

12. A power transmission system according to claim 11, further comprising:
an arranging region for said second holding member,
wherein at least a portion of the arranging region for said second holding member and at least a portion of the arranging region for said electric motor overlap on each other in the axial direction of the output shaft of said electric motor.

13. A power transmission system according comprising:
an engine;
an electric motor;
a power synthesizing mechanism for synthesizing powers outputted from the engine and the electric motor;
a power generator having an output connected to an input portion of the synthesizing mechanism;

a speed mechanism for changing the rotating speed of said electric motor to transmit a torque of the electric motor to said poer synthesizing mechanism;

an arranging region for said electric motor and an arranging region for said power generator in the axial directions of the output shaft of said electric motor and the rotary shaft of said power generator, wherein said arranging regions do not overlap on each other; further comprising:

a wound transmission member made to run on the output member of said power synthesizing mechanism and an intermediate rotary member;

a differential arranged concentrically with said intermediate rotary member; and a decelerating planetary gear mechanism arranged concentrically with said intermediate rotary member and said differential and, when transmitting the power of the intermediate rotary member to the differential, transmitting the power by decelerating the rotating speed of the power.

14. A power transmission system according to claim 1,
wherein a space for separating the arranging region for said electric motor and the arranging region for said power generator is formed between said electric motor and said power generator in the axial direction, and arranges said power synthesizing mechanism and said speed change mechanism therein.

15. A power transmission system which has a power synthesizing mechanism connected in a power transmitting manner to an electric motor and a power generator having a fixed stator, and a speed change mechanism for changing the rotating speed of said electric motor to transmit a torque of the electric motor to said power synthesizing mechanism, comprising:

an arranging region for said electric motor and an arranging region for said power generator in the axial directions of the output shaft of said electric motor and the rotary shaft of said power generator, wherein said arranging regions do not overlap on each other, wherein said power synthesizing mechanism includes a first planetary gear mechanism having: a first sun gear; a first ring gear arranged on the outer side of said first sun gear; and a first carrier for holding a first pinion gear meshing with said first sun gear and said first ring gear and connected to an engine, and wherein said speed change mechanism includes: a second planetary gear mechanism having: a second sun gear connected to the electric motor; a second ring gear arranged on the outer side of said second sun gear and connected to the first ring gear; and a second carrier for holding a second pinion gear meshing with said second sun gear and said second ring gear: and a fixing mechanism for increasing the torque of said electric motor by fixing any of said second sun gear, said second ring gear and said second carrier, to transmit the increased torque to said power synthesizing mechanism.

16. A power transmission system according to claim 15, further comprising:

a rotary member for connecting said engine and said first carrier and is arranged on the same axis as the output shaft of said electric motor.

17. A power transmission system according to claim 15, further comprising:

a rotary member offset in the radial direction with respect to the output shaft of said electric motor and connected to said engine.

18. A power transmission system according to claim 15, further comprising, a first gear connected to the output shaft of said electric motor, and wherein said speed change mechanism includes an internal gear, and wherein said first gear is arranged in the inside space of said internal gear and meshes with said internal gear.

19. A power transmission system according to claim 18, further comprising:

a second holding member for holding said internal gear rotatably and is arranged on the outer side of said internal gear.

20. A power transmission system according to claim 19, further comprising:

an arranging region for said second holding member, wherein at least a portion of the arranging region for said second holding member and at least a portion of the arranging region for said electric motor overlap on each other in the axial direction of the output shaft of said electric motor.

21. A power transmission system according to claim 19, further comprising:

a fourth gear made rotatable together with said first ring gear; and a fifth gear made rotatable together with said fourth gear, wherein the output shaft of said engine is connected to said first sun gear, wherein said speed change mechanism includes said fourth gear, and a sixth gear for transmitting the power of said electric motor to said fourth gear, and wherein the power of said first ring gear and the power of said fourth gear are synthesized so that the synthesized power is transmitted through said fifth gear to wheels.

22. A power transmission system according to claim 15, further comprising:

a second gear made rotatable together with said first ring gear, wherein the output shaft of said engine is connected to said first carrier, and wherein said speed change mechanism includes said second gear, and a third gear for transmitting the power of said electric motor to said second gear.

23. A power transmission system according to claim 15, further comprising:

a seventh gear made rotatable together with said first ring gear; and an eighth gear mesh with said seventh gear, wherein said speed change mechanism includes said eighth gear, and a ninth gear for transmitting the power of said electric motor to said eighth gear, and wherein the power of said seventh gear and the power of said ninth gear are synthesized so that the synthesized power is transmitted through said eighth gear to wheels.

24. A power transmission system which has a power synthesizing mechanism connected in a power transmitting manner to an electric motor and a power generator having a fixed stator, and a speed change mechanism for changing the rotating speed of said electric motor to transmit a torque of the electric motor to said power synthesizing mechanism, comprising:

an arranging region for said electric motor and an arranging region for said power generator in the axial directions of the output shaft of said electric motor and the rotary shaft of said power generator, wherein said arranging regions do not overlap on each other, wherein said power synthesizing mechanism includes a first planetary gear mechanism having: a first sun gear; a first ring gear arranged on the outer side of said first sun gear; and a first carrier for holding a first pinion gear meshing with said first sun gear and said first ring gear, wherein said speed change mechanism includes: a second planetary gear mechanism having: a second sun gear; a second ring gear arranged on the outer side of said second sun gear; and a second carrier for holding a second pinion gear meshing with said second sun gear and said second ring gear; and a fixing mechanism for increasing the torque of said electric motor by fixing any of said second sun gear, said second ring gear and said second carrier, to transmit the increased torque to said power synthesizing mechanism, and wherein the first ring gear of said first planetary gear mechanism and the second ring gear of said second planetary gear mechanism are rotatably held by a first holding member which is arranged on the outer side of said first ring gear and said second ring gear.

25. A power transmission system according to claim 22, further comprising:

an arranging region for said first holding member and an arranging region for said electric motor, wherein at least a portion of the arranging region for said first holding member and at least a portion of the arranging region for said electric motor overlap on each other in the axial direction of the output shaft of said electric motor.

26. A power transmission system which has a poer synthesizing mechanism for synthesizing powers outputted from an electric motor and an engine, a power generator cconnected to the synthesizing mechanism, and a speed change mechanism for augementing a torque transmitted from the electric motor to said power synthesizing mechanism, comprising:

a first planetary gear mechanism comprising the speed change mechanism and having: a first sun gear; a first ring gear arranged on the outer side of the first sun gear; and a first carrier for holding first pinion gears interposed between and meshing with the first sun gear and the first ring gear; and a second planetary gear mechanism comprising the synthesizing mechanism and having: a second sun gear; a second ring gear arranged on the outer side of the second sun gear; and a second carrier for holding second pinion gears interposed between the second sun gear and the second ring gear;

wherein one of the first ring gear and the first carrier is connected to one of the second sun gear, the second ring gear and the second carrier, wherein the second sun gear is connected to the power generator, the second carrier is connected to an output shaft of the engine and the second ring gear is connected to the first ring gear.

27. A power transmission system which has a power synthesizing; mechanism for synthesizing powers outputted from an electric motor and an engine, a power generator having ; a fixed stator and being connected to the synthesizing mechanism and a speed change mechansim for augmenting a torque transmitted from the electric motor to said power synthesizing mechanism, comprising a first planetary gear mechanism comprising the speed change mechanism and having a first sun gear; a first ring arranged on the outer side of the first sun gear; and a first carrier for holding first pinion gears interposed between and meshing with the first sun gear and the first ring gear; and a fixing mechanism for increasing the torque of said electric motor by fixing any of said first sun gear, said first ring gear and said first carrier, to transmit the increased torque to said power synthesizing mechanism, wherein the first pinion gears mesh with the first sun gear and the first ring gear, and wherein the first sun gear is connected to the electric motor, the first ring gear is fixed by the fixing mechanism and the first carrier is connected to an output member.

28. A power transmission system according to claim 27, further comprising:

a second planetary gear mechanism comprising the synthesizing mechanism and having: a second sun gear; a second ring gear arranged on the outer side of the second sun gear; and a second carrier for holding second pinion gears interposed between the second sun gear and the second ring gear:

wherein one of the first sun gear, the first ring gear and the first carrier is connected to one of the second sun gear, the second ring gear and the second carrier.

29. A power transmission system according to claim 27, wherein the second pinion gears mesh with the second sun gear and the second ring gear, wherein the second sun gear is connected to the power generator, the second carrier is connected to an output shaft of the engine and the second ring gear is connected to the first ring gear.

30. A power transmission system comprising:

an engine;

an electric motor;

a power synthesizing mechanism for synthesizing powers outputted from the engine and the electric motor;

a power generator having a fixed stator and an output portion connected to an input portion of the synthesizing mechanism;

a speed change mechansim having a plurality of gears for changing the rotating speed of said electric motor to transmit a torque of the electric motor to said power synthesizing mechanism;

an arranging region for said electric motor and an arranging region for said power generator in the axial directions of the output shaft of said electric motor and the rotary shaft of said power generator, wherein said arranging regions do not overlap on each other; and a fixing mechanism for continuously fixing any of the gears to the casing.

31. A power transmission system according to claim 30, wherein said fixing mechansim continuously fixes any of the gears to increase the torque of said electric motor and to transmit the increased torque to said power synthesizing mechansim.

32. A power transmission system according to clam 30, wherein said power synthesizing mechanism includes a planetary gear mechanism having a sun gear; a ring gear arranged on the outer side of said sun gear; and a carrier for holding a pinion gear meshing with said sun gear and said ring gear.

33. A power transmission system according to claim 30, wherein said speed change mechanism includes a planetary gear mechanism having a sun gear a ring gear arranged on the outer side of said sun gear; and a carrier for holding a pinion gear meshing with said sun gear and said ring gear.

34. A power transmission system according to claim 33, wherein said speed change mechanism has any of said sun gear, said ring gear and said carrier fixed so that the torque of said electric motor is increased by said speed change mechansim and transmitted to said power synthesizing mechanism.

35. A power transmission system comprising:
an engine;
an electric motor;
a power synthesizing mechanism for synthesizing powers outputted from the engine and the electric motor;
a power generator having a fixed stator and an output portion connected to an input portion of the synthesizing mechanism;
a speed change mechanism having a plurality of gear for changing the rotating speed of said electric motor to transmit a torque of the electric motor to said power synthesizing mechanism; and
a fixing mechanism for continuously fixing any of the gears to the casing.

36. A power transmission system according to claim 35, further comprising:
a first planetary gear mechanism comprising the speed change mechanism and having a first sun gear; a first ring gear arranged on the outer side of the first sun gear; and a first carrier for holding first pinion gears interposed between the first sun gear and the first ring gear.

37. A power transmission system according to claim 36, wherein said fixing mechanism includes a mechanism for increasing the torque of said electric motor by fixing any of said first sun gear, said first ring gear and said first carrier, to transmit the increased torque to said power synthesizing mechanism.

38. A power transmission system according to claim 36, further comprising:
a second planetary gear mechanism comprising the synthesizing mechansim and having a second sun gear; a second ring gear arranged on the outer side of the second sun gear; and a second carrier for holding second pinion gears interposed between the second sun gear and the second ring gear;
wherein one of the first sun gear, the first ring gear and the first carrier is connected to one of the second sun gear, the second ring gear and the second carrier.

39. A power transmission system which has a power synthesizing mechanism connected in a power transmitting manner to an electric motor and a power generator, and a speed change mechanism for changing the rotating speed of said electric motor to transmit a torque of the electric motor to said power synthesizing mechanism, comprising:
an arranging region for said electric motor and an arranging region for said power generator in the axial directions of the output shaft of said electric motor and the rotary shaft of said power generator,
a wound transmission member made to run on the output member of said power synthesizing mechanism and an intermediate rotary member;
a differential arranged concentrically with said intermediate rotary member; and a decelerating planetary gear mechanism arranged concentrically with said intermediate rotary member and said differential and, when transmitting the power of the intermediate rotary member to the differential, transmitting the power by decelerating the rotating speed of the power,
wherein said arranging regions do not overlap on each other.

40. A power transmission system which has a power synthesizing mechanism connected in a power transmitting manner to an electric motor and a power generator, and a speed change mechanism for changing the rotating speed of said electric motor to transmit a torque of the electric motor to said power synthesizing mechanism, comprising:
an arranging region for said electric motor and an arranging region for said power generator in the axial directions of the output shaft of said electric motor and the rotary shaft of said power generator,
a wound transmission member made to run on the output member of said power synthesizing mechanism and an intermediate rotary member;
a differential arranged concentrically with said intermediate rotary member; and
a decelerating planetary gear mechanism arranged concentrically with said intermediate rotary member and said differential and, when transmitting the power of the intermediate rotary member to the differential, transmitting the power by decelerating the rotating speed of the power,
wherein said arranging regions do not overlap on each other, and
wherein a space for separating the arranging region for said electric motor and the arranging region for said power generator is formed between said electric motor and said power generator in the axial direction, and arranges said power synthesizing mechanism and said speed change mechanism therein.

41. A power transmission system which has a power synthesizing mechanism for synthesizing powers outputted from an electric motor and an engine, a power generator having a fixed stator and being connected to the synthesizing mechanism, and a speed change mechanism for augmenting a torque transmitted from the electric motor to said power synthesizing mechanism, comprising:
a first planetary gear mechanism comprising the speed change mechanism and having: a first sun gear; a first ring gear arranged on the outer side of the first sun gear; and a first carrier for holding first pinion gears interposed between the first sun gear and the first ring gear.

42. A power transmission system which has a power synthesizing mechanism connected in a power transmitting manner to an electric motor and a power generator, and a speed change mechanism for changing the rotating speed of said electric motor to transmit a torque of the electric motor to said power synthesizing mechanism, comprising:
an arranging region for said electric motor and arranging region for said power generator in the axial direction of the output shaft of said electric motor and a rotary shaft of said power generator, wherein said arranging regions do not overlap on each other,
a first plaetary gear mechanism comprising the power synthesizing mechanism and having a first sun gear, a first ring gear arranged on the outer side of said first sun gear, and a first carrier for holding a first pinion gear meshing with said first sun gear, a second planetary gear mechanism comprisng the speed change mechaism and having a second sun gear, a second ring gear arranged on the outer side of said second sun gear, and a second carrier for holding a second pinion gear meshing with said second sun gear and said second ring gear, and a first holding member for holding the first ring gear and the second ring gear rotatably, wherein said first carrier is connected to an engine, wherein said second sun gear is connected to said electric motor, wherein said second ring gear is fixed, wherein said first ring gear and said second carrier are connected each other, and wherein at least a portion of an arranging region for said first holding member and at least a portion of an arranging region for said electric motor overlap on each other in the axial direction of the output shaft of said electric motor.

43. A power transmission system which has a power synthesizing mechanism connected in a power transmitting manner to an electric motor and a power generator, and a speed change mechanism for changing the rotating speed of said electric motor to transmit a torque of the electric motor to said power synthesizing mechanism, comprising:

an arranging region for said electric motor and arranging region for said power generator in the axial direction of the output shaft of said electric motor and a rotary shaft of said power generator, wherein, said arranging regions do not overlap on each other, said power synthesizing mechanism includes a first planetary gear mechanism having a first sun gear; a first ring gear arranged on the outer side of said first sun gear; and a first carrier for holding a first pinion gear meshing with said first sun gear and said first ring gear and connected to an engine, said first carrier is connected to an engine, said first sun gear is connected motor is connected to said first ring gear through said speed change mechanism, and said output shaft of the electric motor offset in the radial direction with respect ot a rotary member connected to said engine.

44. A power transmission system which has a power synthesizing mechanism connected in a power transitting manner to an electric motor and a power generator, and a speed change mechanism for changing the rotating speed of said electric motor to transmit a torque of the electric motor to said power synthesizing mechanism, comprising:

an arranging region for said electric motor and arranging region for said power generator in the axial direction of the output shaft of said electric motor and a rotary shaft of said power generator, wherein, said arranging regions do not overlap on each other, said output shaft of the electric motor offset in the radial direction with respect to a rotary member connected to said engine, said speed change mechanism includes an internal gear, and a first gear connected to the output shaft of said electric motor is arranged in the inside space of said internal gear and meshes with said internal gear.

45. A power transmission system which has a power synthesizing mechanism connected in a power transmitting manner to an electric motor and a power generator, and a speed change mechanism for changing the rotating speed of said electric motor to transmit a torque of the electric motor to said power synthesizing mechanism, comprising an arranging region for said electric motor and arranging region for said power generator in the axial direction of the output shaft of said electric motor and a rotary shaft of said power generator, wherein said arranging regions do not overlap on each other, and a first planetary gear mechanism comprising said power synthesizing mechanism and having a first sun gear a first ring gear arranged on the outer side of the first sun gear and a first carrier for holding first pinion gears meshing with the first sun gear and the first ring gear, wherein an output shaft of the engine is connected to the first carrier, wherein the output shaft of said electric motor offset in the radial direction with respect to a rotary member connected to said engine, and wherein said speed change mechansim includes a second gear made rotatable together with the first ring gear and a third gear for transmitting the power of the electric motor to the second gear.

46. A power transmission system which has a power synthesizing mechansim connected in a power transmitting manner to an electric motor and a power generator, and a speed change mechanism for changing the rotating speed of said electric motor to transmit a torque of the electric motor to said power synthesizing mechanism, comprising:

an arranging region for said electric motor and arranging region for said power generator in the axial direction of the output shaft of said electric motor and a rotary shaft of said power generator, wherein said arranging regions do not overlap on each other;

a first planetary gear mechanism comprising said power synthesizing mechanism and having a first sun gear; a first ring gear arranged on the outer side of the first sun gear; and a first carrier for holding first pinion gears meshing with the first sun gear and the first ring gear;

a fourth gear made rotatable together with the first ring gear; a fifth gear made rotatable together with the fourth gear, wherein the output shaft of said engine is connected to said first carrier, wherein said speed change mechanism includes said fourth gear, and a sixth gear for transmitting the power of said electric motor to said fourth gear, wherein the power of said first ring gear and the power of said fourth gear are synthesized so that the synthesized power is transmitted through said fifth gear to wheels, and wherein the output shaft of said electric motor offset in the radial direction with respect to a rotary member connected to said engine.

47. A power transmission system which has a power synthesizing mechanism connected in a power tranmitting manner to an electric motor and a power generator, and a speed change mechanism for changing the rotating speed of said electric motor to transmit a torque of the electric motor to said power synthesizing mechanism comprising:

an arranging region for said electric motor and arranging region for said power generator in the axial direction of the output shaft of said electric motor and a rotary shaft of shaid power generator, wherein said arranging regions do not overlap on each other;

a first planetary gear mechanism comprising said power synthesizing mechanism and having a first sun gear a first ring gear arranged on the outer side of the first sun gear; and a first carrier for holding first pinion gears meshing with the first sun gear and the first ring gear;

a seventh gear made rotatable together with the first ring gear; an eighth gear mesh with said seventh gear, wherein said speed change mechanism includes said eighth gear, and a ninth gear for transmitting the power of said electric motor to said seventh gear, wherein the power of said seventh gear and the power of said ninth gear are synthesized so that the synthesized power is transmitted through said fifth gear to wheels, wherein the output shaft of said electric motor offset in the radial direction with respect to a rotary member connected to an engine.

* * * * *